United States Patent
Weiss et al.

(10) Patent No.: US 11,939,227 B2
(45) Date of Patent: *Mar. 26, 2024

(54) METHODS AND SYSTEMS FOR UTILIZING CALCIUM COMPOUND FROM CALCINED LIMESTONE

(71) Applicant: Arelac, Inc., San Jose, CA (US)

(72) Inventors: Michael Joseph Weiss, Los Gatos, CA (US); Ryan Gilliam, San Jose, CA (US)

(73) Assignee: Arelac, Inc., San Jose, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/933,490

(22) Filed: Jul. 20, 2020

(65) Prior Publication Data

US 2021/0017035 A1    Jan. 21, 2021

Related U.S. Application Data

(60) Provisional application No. 62/876,711, filed on Jul. 21, 2019.

(51) Int. Cl.
| | |
|---|---|
| C01F 11/18 | (2006.01) |
| C01C 1/08 | (2006.01) |
| C01C 1/16 | (2006.01) |
| C01C 1/22 | (2006.01) |
| C01C 1/24 | (2006.01) |
| C01F 11/06 | (2006.01) |

(Continued)

(52) U.S. Cl.
CPC .............. *C01F 11/183* (2013.01); *C04B 2/10* (2013.01)

(58) Field of Classification Search
None
See application file for complete search history.

(56) References Cited

U.S. PATENT DOCUMENTS

| 2,212,446 A | 8/1940 | Macintire |
| 4,329,320 A | 5/1982 | Vydra et al. |

(Continued)

FOREIGN PATENT DOCUMENTS

| CN | 100390064 C | 5/2008 |
| CN | 101293663 B | 5/2011 |

(Continued)

OTHER PUBLICATIONS

Dri et al., Dissolution of steel slag and recycled concrete aggregate in ammonium bisulphrate for CO2 mineral carbonation, Fuel processing technology, 2013, 113, 114-122.

(Continued)

*Primary Examiner* — Daniel Berns
(74) *Attorney, Agent, or Firm* — Schwegman Lundberg & Woessner, P.A.

(57) ABSTRACT

Provided herein are methods comprising a) calcining limestone in a cement plant to form carbon dioxide and calcium compound selected from calcium oxide, calcium hydroxide, or combination thereof; b) treating the calcium compound with N-containing salt in water to produce an aqueous solution comprising calcium salt and N-containing salt; and c) contacting the aqueous solution with the carbon dioxide under one or more precipitation conditions to produce a precipitation material comprising calcium carbonate and a supernatant aqueous solution wherein the calcium carbonate comprises vaterite.

23 Claims, 2 Drawing Sheets

(51) Int. Cl.
*C01F 11/24* (2006.01)
*C04B 2/10* (2006.01)
*C04B 14/28* (2006.01)
*C04B 28/10* (2006.01)

(56) References Cited

U.S. PATENT DOCUMENTS

| | | | |
|---|---|---|---|
| 5,275,651 | A | 1/1994 | Minayoshi et al. |
| 5,290,353 | A | 3/1994 | Goffin et al. |
| 5,376,343 | A | 12/1994 | Fouche |
| 5,714,113 | A * | 2/1998 | Gitman ............... F27D 99/0033 432/13 |
| 5,792,440 | A | 8/1998 | Huege |
| 6,132,696 | A | 10/2000 | Porter et al. |
| 7,749,476 | B2 | 7/2010 | Constantz et al. |
| 7,754,169 | B2 | 7/2010 | Constantz et al. |
| 7,976,628 | B2 | 7/2011 | Blount et al. |
| 8,333,944 | B2 | 12/2012 | Constantz et al. |
| 8,470,275 | B2 | 6/2013 | Constantz et al. |
| 8,992,875 | B2 | 3/2015 | Tavakkoli et al. |
| 9,260,314 | B2 | 2/2016 | Constantz et al. |
| 9,902,652 | B2 | 2/2018 | Devenney et al. |
| 11,377,363 | B2 | 7/2022 | Gilliam et al. |
| 11,530,164 | B2 | 12/2022 | Hargis et al. |
| 11,667,567 | B2 | 6/2023 | Hargis et al. |
| 11,673,832 | B1 | 6/2023 | Hargis et al. |
| 2009/0081096 | A1 | 3/2009 | Pellegrin |
| 2010/0319586 | A1 | 12/2010 | Blount et al. |
| 2011/0038774 | A1 | 2/2011 | Zhong |
| 2011/0139628 | A1 | 6/2011 | Teir et al. |
| 2013/0064752 | A1 | 3/2013 | Kim et al. |
| 2013/0256939 | A1 | 10/2013 | Devenney et al. |
| 2015/0307400 | A1* | 10/2015 | Devenney ............... C01F 11/18 423/430 |
| 2016/0074806 | A1 | 3/2016 | Benyahia |
| 2021/0261428 | A1 | 8/2021 | Weiss et al. |
| 2022/0306483 | A1 | 9/2022 | Gilliam et al. |
| 2023/0104761 | A1 | 4/2023 | Weiss et al. |
| 2023/0107410 | A1 | 4/2023 | Weiss et al. |
| 2023/0112173 | A1 | 4/2023 | Hargis et al. |
| 2023/0118703 | A1 | 4/2023 | Weiss et al. |
| 2023/0145402 | A1 | 5/2023 | Gilliam et al. |
| 2023/0192546 | A1 | 6/2023 | Hargis et al. |

FOREIGN PATENT DOCUMENTS

| | | | |
|---|---|---|---|
| CN | 101519720 B * | 1/2012 | ............ C22B 1/248 |
| CN | 103170226 A | 6/2013 | |
| CN | 102267713 B | 7/2013 | |
| CN | 103189315 A | 7/2013 | |
| CN | 103635428 A | 3/2014 | |
| CN | 104487458 A | 4/2015 | |
| EP | 0558275 A1 | 9/1993 | |
| EP | 2447213 A1 | 5/2012 | |
| EP | 2828434 A1 | 1/2015 | |
| EP | 4171785 A1 | 5/2023 | |
| WO | WO-2011017609 A1 | 2/2011 | |
| WO | WO-2012055750 A1 | 5/2012 | |
| WO | WO-2012149173 A2 | 11/2012 | |
| WO | WO-2013148279 A1 | 10/2013 | |
| WO | WO-2021173790 A1 | 9/2021 | |

OTHER PUBLICATIONS

Eloneva, et al. Preliminary assessment of a method utilizing carbon dioxide and steelmaking slags to produce precipitated calcium carbonate. Applied Energy. 2012; 90:329-334.

Eloneva, et al. Reduction of CO2 Emissions from Steel Plants by Using Steelmaking Slags for Production of Marketable Calcium Carbonate. Steel Research Int. 2009; 80(6):415-421.

European search report and opinion dated Jul. 29, 2015 for EP Application No. 13769503.

Hargis, et al., Calcium carbonate cement: A carbon capture, utilization, and storage (CCUS) technique. Materials 2021; 14(2709) 1-12 Pages.

International search report and written opinion dated Jun. 3, 2013 for PCT/US2013/031670.

International search report and written opinion dated Jul. 9, 2015 for PCT/US2015/027272.

Matilla, et al. Production of precipitated calcium carbonate from steel converter slag and other calcium-containing industrial wastes and residues. Advances in inorganic chemistry. 2014; vol. 66, Ch. 10. 347-384.

PCT/US2021/019585 International Search Report and Written Opinion dated May 6, 2021.

PCT/US2021/019597 International Search Report and Written Opinion dated May 6, 2021.

PCT/US2021/039825 International Search Report and Written Opinion dated Oct. 7, 2021.

U.S. Appl. No. 17/184,904 Office Action dated Oct. 27, 2022.

U.S. Appl. No. 17/184,933 Notice of Allowance dated Nov. 23, 2022.

U.S. Appl. No. 17/184,933 Office Action dated Jul. 1, 2022.

U.S. Appl. No. 17/363,537 Notice of Allowance dated Apr. 29, 2022.

U.S. Appl. No. 17/363,537 Office Action dated Apr. 11, 2022.

Zhang, et al. Preparation of CaCO3 superfine powder by calcium carbide residue. Energy Procedia. 2012; 17:1635-1640.

Co-pending U.S. Appl. No. 18/122,930, inventors Craig; W. Hargis et al., filed on Mar. 17, 2023.

Co-pending U.S. Appl. No. 18/136,600, inventors Hargis Craig et al., filed on Apr. 19, 2023.

Co-pending U.S. Appl. No. 18/139,815, inventors Hargis Craig; W. et al., filed on Apr. 26, 2023.

Co-pending U.S. Appl. No. 18/141,129, inventors Hargis Craig; W. et al., filed on Apr. 28, 2023.

Co-pending U.S. Appl. No. 18/200,208, inventors Michael; Joseph Weiss et al., filed on May 22, 2023.

EP20843867.1 Extended European Search Report dated Jul. 12, 2023.

U.S. Appl. No. 17/184,904 Notice of Allowance dated May 12, 2023.

U.S. Appl. No. 18/075,929 Notice of Allowance dated Jul. 31, 2023.

"International Application Serial No. PCT US2020 042810, International Preliminary Report on Patentability dated Feb. 3, 2022", 6 pgs.

"Chinese Application Serial No. 202080066273.X, Office Action dated Aug. 10, 2023", W English Translation, 8 pgs.

"Canadian Application Serial No. 3, 145,314, Office Action dated Sep. 20, 2023", 3 pgs.

"Brazil Application Serial No. BR112022001026-5, Office Action dated Dec. 8, 2023", w/ Machine Translation, 5 pgs.

"Canadian Application Serial No. 3,145,314, Response filed Jan. 15, 2024 to Office Action dated Sep. 20, 2023", 19 pgs.

"Indian Application Serial No. 202217008555, First Examination Report dated Nov. 3, 2023", 7 pgs.

* cited by examiner

METHODS AND SYSTEMS FOR UTILIZING CALCIUM COMPOUND FROM CALCINED LIMESTONE

CROSS-REFERENCE TO RELATED APPLICATIONS

This application claims benefit of U.S. Provisional Application No. 62/876,711, filed Jul. 21, 2019, which is incorporated herein by reference in its entirety in the present disclosure.

BACKGROUND

Carbon dioxide ($CO_2$) emissions have been identified as a major contributor to the phenomenon of global warming. $CO_2$ is a by-product of combustion and it creates operational, economical, and environmental problems. It may be expected that elevated atmospheric concentrations of $CO_2$ and other greenhouse gases will facilitate greater storage of heat within the atmosphere leading to enhanced surface temperatures and rapid climate change. In addition, elevated levels of $CO_2$ in the atmosphere may also further acidify the world's oceans due to the dissolution of $CO_2$ and formation of carbonic acid. The impact of climate change and ocean acidification may likely be economically expensive and environmentally hazardous if not timely handled. Reducing potential risks of climate change requires sequestration and avoidance of $CO_2$ from various anthropogenic processes.

SUMMARY

In one aspect, there is provided a method comprising a) calcining limestone in a cement plant to form carbon dioxide and calcium compound selected from calcium oxide, calcium hydroxide, or combination thereof; b) treating the calcium compound with N-containing salt in water to produce an aqueous solution comprising calcium salt and N-containing salt; and c) contacting the aqueous solution with the carbon dioxide under one or more precipitation conditions to produce a precipitation material comprising calcium carbonate and a supernatant aqueous solution wherein the calcium carbonate comprises vaterite. In some embodiments of the foregoing aspect, the calcium oxide is an underburnt lime, low reactive lime, high reactive lime, or combinations thereof. In some embodiments of the foregoing aspect and embodiments, the calcining step is carried out in a shaft kiln or a rotary kiln. In some embodiments of the foregoing aspect and embodiments, the cement plant is a wet process plant or a dry process plant.

In some embodiments of the foregoing aspect and embodiments, the treating step further comprises adding anhydrous ammonia or an aqueous solution of ammonia.

In some embodiments of the foregoing aspect and embodiments, the N-containing salt is N-containing inorganic salt, N-containing organic salt, or combination thereof. In some embodiments of the foregoing aspect and embodiments, the N-containing salt is N-containing inorganic salt. In some embodiments of the foregoing aspect and embodiments, the N-containing inorganic salt is selected from the group consisting of ammonium halide, ammonium acetate, ammonium sulfate, ammonium sulfite, ammonium nitrate, ammonium nitrite, and combinations thereof. In some embodiments of the foregoing aspect and embodiments, the ammonium halide is ammonium chloride. In some embodiments of the foregoing aspect and embodiments, the N-containing salt is ammonium chloride. In some embodiments of the foregoing aspect and embodiments, the N-containing salt is N-containing organic salt that has N-containing organic compound selected from the group consisting of aliphatic amine, alicyclic amine, heterocyclic amine, and combinations thereof.

In some embodiments of the foregoing aspect and embodiments, the molar ratio of the N-containing salt: calcium compound is between about 0.5:1 to 2:1 by weight. In some embodiments of the foregoing aspect and embodiments, the method further comprises removing and optionally recovering ammonia and/or N-containing salt using one or more steps of (i) recovering a gas exhaust stream comprising ammonia during the treating and/or the contacting step; (ii) wherein the supernatant aqueous solution comprises residual N-containing salt and further comprising recovering the residual N-containing salt from the supernatant aqueous solution; and (iii) wherein the precipitation material comprises residual N-containing salt and further comprising removing and optionally recovering the residual N-containing salt from the precipitation material. In some embodiments of the foregoing aspect and embodiments, the residual N-containing salt is ammonium chloride, ammonium acetate, ammonium sulfate, ammonium sulfite, ammonium hydrosulfide, ammonium thiosulfate, ammonium nitrate, ammonium nitrite, or combinations thereof.

In some embodiments of the foregoing aspect and embodiments, the method further comprises recovering the residual N-containing salt from the supernatant aqueous solution using recovery process selected from the group consisting of thermal decomposition, pH adjustment, reverse osmosis, multi-stage flash, multi-effect distillation, vapor recompression, distillation, and combinations thereof.

In some embodiments of the foregoing aspect and embodiments, the method further comprises recycling the recovered residual N-containing salt back to the treating step of the process, the contacting step of the process, or combination thereof.

In some embodiments of the foregoing aspect and embodiments, the step of recovering the gas exhaust stream comprising ammonia comprises subjecting the gas exhaust stream comprising ammonia to a scrubbing process wherein the scrubbing process comprises scrubbing the gas exhaust stream comprising ammonia with the carbon dioxide from the industrial process and water to produce a solution of ammonia. In some embodiments of the foregoing aspect and embodiments, the step of recovering the gas exhaust stream comprising ammonia comprises subjecting the gas exhaust stream comprising ammonia to a scrubbing process wherein the scrubbing process comprises scrubbing the gas exhaust stream comprising ammonia with hydrochloric acid and water to produce a solution of ammonium chloride.

In some embodiments of the foregoing aspect and embodiments, the solution of ammonia comprises carbamate which is optionally recycled back to the contacting step.

In some embodiments of the foregoing aspect and embodiments, the step (iii) of removing and optionally recovering the residual N-containing salt from the precipitation material comprises heating the precipitation material between about 150-360° C. or between about 100-360° C. or between about 150-200° C. to evaporate the N-containing salt from the precipitation material with optional recovery by condensation of the N-containing salt.

In some embodiments of the foregoing aspect and embodiments, the calcium carbonate comprises reactive vaterite. In some embodiments of the foregoing aspect and embodiments, the calcium carbonate comprises reactive vaterite which stays in the precipitation material as reactive vaterite after heating in step (iii).

In some embodiments of the foregoing aspect and embodiments, the heating of the precipitation material between about 100-360° C. is for more than about 10 minutes or between about 10-60 minutes. In some embodiments of the foregoing aspect and embodiments, the N-containing salt evaporates from the precipitation material in a form comprising ammonia gas, hydrogen chloride gas, chlorine gas, or combinations thereof.

In some embodiments of the foregoing aspect and embodiments, the method further comprises adding water to the precipitation material comprising reactive vaterite and transforming the vaterite to aragonite wherein the aragonite sets and hardens to form cement or cementitious product.

In some embodiments of the foregoing aspect and embodiments, the cementitious product is a formed building material selected from masonry unit, construction panel, conduit, basin, beam, column, slab, acoustic barrier, insulation material, and combinations thereof.

In some embodiments of the foregoing aspect and embodiments, the aqueous solution further comprises solids. In some embodiments of the foregoing aspect and embodiments, the method further comprises separating the solids from the aqueous solution before the contacting step by filtration and/or centrifugation. In some embodiments of the foregoing aspect and embodiments, the separated solids are added to the precipitation material as a filler or as supplementary cementitious material (SCM).

In some embodiments of the foregoing aspect and embodiments, the method further comprises recovering the residual N-containing salt from the solids using a recovery process selected from the group consisting of rinsing, thermal decomposition, pH adjustment, and combinations thereof.

In some embodiments of the foregoing aspect and embodiments, the solids are not separated from the aqueous solution and the aqueous solution is contacted with the carbon dioxide to produce the precipitation material further comprising the solids. In some embodiments of the foregoing aspect and embodiments, the solids comprise carbon, silica, iron oxide, aluminum oxide, or combination thereof. In some embodiments of the foregoing aspect and embodiments, the solids are between 1-40 wt % in the aqueous solution, in the precipitation material, or combination thereof.

In some embodiments of the foregoing aspect and embodiments, the one or more precipitation conditions are selected from temperature, pH, pressure, ion ratio, precipitation rate, presence of additive, presence of ionic species, concentration of additive and ionic species, stirring, residence time, mixing rate, forms of agitation, presence of seed crystal, catalyst, membrane, or substrate, dewatering, drying, ball milling, and combinations thereof. In some embodiments of the foregoing aspect and embodiments, the one or more precipitation conditions that favor formation of the calcium carbonate or that favor formation of reactive vaterite comprise a pH of between 7-8.5 of the aqueous solution, temperature of the solution between 20-80° C., residence time of between 15-60 minutes, or combinations thereof.

In one aspect, there is provided a product formed by the foregoing method aspect and embodiments.

DRAWINGS

The features of the invention are set forth with particularity in the appended claims. A better understanding of the features and advantages of the invention will be obtained by reference to the following detailed description that sets forth illustrative embodiments, in which the principles of the invention are utilized, and the accompanying drawings of which:

DESCRIPTION

Figure 1:
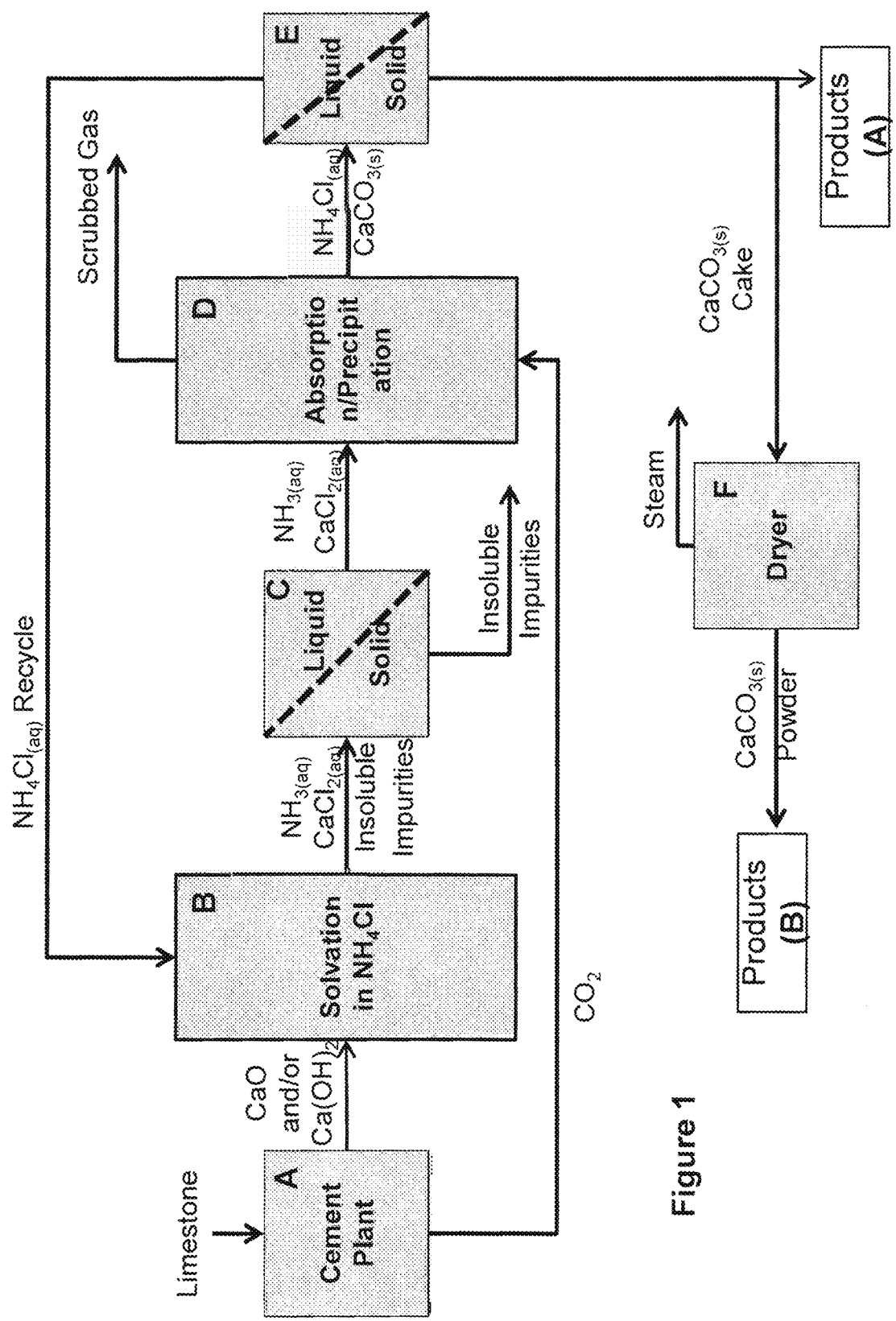
FIG. 1 illustrates some method and system embodiments provided herein.

Provided herein are methods and systems that produce calcium carbonate using lime and waste from a cement plant that calcines limestone. The products obtained from the calcination of the limestone include calcium oxide (lime or quick lime), calcium hydroxide (slaked lime) and waste gas such as carbon dioxide. Provided herein are unique methods and systems that use the lime and $CO_2$ from the cement plant to form calcium carbonate which can be used in various products as described herein. In some embodiments of the methods provided herein, the calcium oxide and/or hydroxide from the cement plant is treated with N-containing salts, to solubilize calcium compound in an aqueous solution which is then treated with the carbon dioxide gas to form precipitate or precipitation material comprising calcium carbonate.

In some embodiments, the calcium carbonate is formed in vaterite polymorphic form or in some embodiments the calcium carbonate is precipitated calcium carbonate (PCC). The PCC can be in the form of vaterite, aragonite, calcite, or combinations thereof. In some embodiments, the calcium carbonate is in stable vaterite form or is in a reactive vaterite form, both of which have been described herein. In some embodiments, the precipitation material comprising reactive vaterite possesses unique properties, including, but not limited to, cementing properties by transforming to aragonite which sets and cements with high compressive strength. In some embodiments, the vaterite transformation to aragonite results in cement that can be used to form building materials and/or cementitious products such as, but not limited to, formed building materials such as construction panel etc. further described herein. In some embodiments, the vaterite in the product is stable (does not transform to aragonite) and may be used as a filler or supplementary cementitious material (SCM) when mixed with other cement such as Ordinary Portland Cement (OPC). The precipitation material comprising vaterite may also be used as an aggregate where the reactive vaterite containing precipitation material after contact with water transforms to aragonite which sets and cements and which is then chopped up after cementation to form the aggregate. In some embodiments, where the calcium carbonate is formed as PCC, the PCC material is cementitious or may be used as a filler in products such as paper product, polymer product, lubricant, adhesive, rubber product, chalk, asphalt product, paint, abrasive for paint removal, personal care product, cosmetic, cleaning product, personal hygiene product, ingestible product, agricultural product, soil amendment product, pesticide, environmental remediation product, and combination thereof. Such use of the precipitation material as a filler in non-cementitious products has been described in U.S. Pat. No. 7,829,053, issued Nov. 9, 2010, which is incorporated herein by reference in its entirety.

The N-containing salt, used to solubilize the calcium ions from the calcium compound, may result in residual N-containing salt remaining in the supernatant solution as well as in the precipitate itself after the formation of the precipitate. In some embodiments, the presence of the residual N-containing salt in the precipitate may not be desirable as the N-containing salt such as, for example only, ammonium chloride, ammonium acetate, ammonium sulfate, ammonium sulfite, ammonium hydrosulfide, ammonium thiosulfate, ammonium nitrate, ammonium nitrite or any other N-containing organic salt or combinations thereof, in the precipitate may be detrimental to the cementitious products thus formed from the precipitation material. For example, chloride in the cementitious product may be corrosive to metal structures that are used along with the cementitious products. Further, the residual ammonia may add to the foul smell in the products. Furthermore, the non-recovered and wasted residual N-containing salt in the precipitate as well as the supernatant solution may be economically as well as environmentally not feasible. Various methods have been provided herein to remove and optionally recover the residual N-containing salt from the supernatant solution as well as the precipitate.

Before the invention is described in greater detail, it is to be understood that this invention is not limited to particular embodiments described, as such may, of course, vary. It is also to be understood that the terminology used herein is for the purpose of describing particular embodiments only, and is not intended to be limiting.

Where a range of values is provided, it is understood that each intervening value, to the tenth of the unit of the lower limit unless the context clearly dictates otherwise, between the upper and lower limit of that range and any other stated or intervening value in that stated range, is encompassed within the invention. The upper and lower limits of these smaller ranges may independently be included in the smaller ranges and are also encompassed within the invention, subject to any specifically excluded limit in the stated range. Where the stated range includes one or both of the limits, ranges excluding either or both of those included limits are also included in the invention.

Certain ranges are presented herein with numerical values being preceded by the term "about." The term "about" is used herein to provide literal support for the exact number that it precedes, as well as a number that is near to or approximately the number that the term precedes. In determining whether a number is near to or approximately a specifically recited number, the near or approximating unrequited number may be a number, which, in the context in which it is presented, provides the substantial equivalent of the specifically recited number.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the invention, representative illustrative methods and materials are described herein.

All publications, patents, and patent applications cited in this specification are incorporated herein by reference to the same extent as if each individual publication, patent, or patent application were specifically and individually indicated to be incorporated by reference. Furthermore, each cited publication, patent, or patent application is incorporated herein by reference to disclose and describe the subject matter in connection with which the publications are cited. The citation of any publication is for its disclosure prior to the filing date and should not be construed as an admission that the invention described herein is not entitled to antedate such publication by virtue of prior invention. Further, the dates of publication provided may be different from the actual publication dates, which may need to be independently confirmed.

It is noted that, as used herein and in the appended claims, the singular forms "a", "an", and "the" include plural references unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation.

As will be apparent to those of skill in the art upon reading this disclosure, each of the individual embodiments described and illustrated herein has discrete components and features which may be readily separated from or combined with the features of any of the other several embodiments without departing from the scope or spirit of the invention. Any recited method can be carried out in the order of events recited or in any other order, which is logically possible.

I. Methods and Systems

There are provided methods and systems to utilize the calcium compound and $CO_2$ from the cement plant undergoing limestone calcination to form polymorphs of calcium carbonate. The "limestone" as used herein, means $CaCO_3$ and may further include other impurities typically present in the limestone. The "calcium compound" as used herein, includes any calcium compound formed from the calcination of the limestone. The methods and systems provided herein utilize $CO_2$ and calcium compound selected from calcium oxide, calcium hydroxide, or combination thereof from the cement plant that is calcining limestone and form precipitation material comprising calcium carbonate such as, but not limited to, stable or reactive vaterite or PCC. These methods and systems are as described in more detail herein. The polymorphs of calcium carbonate formed herein, such as vaterite, can be used as cement or as filler. In some embodiments, the calcium compound selected from calcium oxide, calcium hydroxide, or combination thereof can act both as a source of divalent cations ($Ca^{2+}$) as well as proton-removing agent. In some embodiments, the calcium hydroxide formed by solubilization of calcium oxide in water can provide calcium ions as a source of divalent cations and hydroxide as a source of proton-removing agent and react with carbon dioxide to form calcium carbonate precipitates. The vaterite polymorph of the calcium carbonate precipitate may be a stable vaterite that may act as filler in the products or the vaterite may be a reactive vaterite that may transform to aragonite during the dissolution-reprecipitation process, as described herein.

In some embodiments of the methods provided herein, the calcium compound selected from calcium oxide, calcium hydroxide, or combination thereof is treated with the N-containing salt, to solubilize the calcium compound in an aqueous solution which is then treated with carbon dioxide gas to form precipitation material comprising calcium carbonate. The process may result in residual N-containing salt remaining in the supernatant solution as well as in the precipitate itself after the formation of the precipitate. Various methods have been provided herein to remove and optionally recover the residual N-containing salt from the supernatant solution as well as the precipitate. In some embodiments, the calcium compound obtained after calcination of the limestone may contain sulfur depending on the source of the limestone. The sulfur in the calcium compound may get introduced into the aqueous solution after the solubilization of the calcium compound with N-containing salts. In an alkaline solution, various sulfur compounds containing various sulfur ionic species may be present in the solution including, but not limited to, sulfite ($SO_3^{2-}$), sulfate ($SO_4^{2-}$), hydrosulfide ($HS^-$), thiosulfate ($S_2O_3^{2-}$), polysulfides ($S_n^{2-}$), thiol (RSH), and the like. The "sulfur compound" as used herein, includes any sulfur ion containing compound. Examples of sulfur compounds have been provided herein. Various methods have been provided herein to remove and optionally recover the sulfur compound(s) from the supernatant solution as well as the precipitate.

In one aspect, there is provided a method comprising a) calcining limestone in a cement plant to form carbon dioxide and calcium compound selected from calcium oxide, calcium hydroxide, or combination thereof; b) treating the calcium compound with N-containing salt in water to produce an aqueous solution comprising calcium salt and N-containing salt; and c) contacting the aqueous solution with the carbon dioxide under one or more precipitation conditions to produce a precipitation material comprising calcium carbonate and a supernatant aqueous solution wherein the calcium carbonate comprises vaterite. In some embodiments of the aforementioned aspect, the method further comprises dewatering the precipitation material to separate the precipitate from the supernatant aqueous solution. In some embodiments of the foregoing aspect, the calcium carbonate comprises reactive vaterite. In some embodiments of the foregoing aspect and embodiment, the calcium carbonate comprises more than 50 wt % reactive vaterite.

The foregoing aspect and embodiments are illustrated in FIG. 1. It is to be understood that the steps illustrated in FIG. 1 may be modified or the order of the steps may be changed or more steps may be added or deleted depending on the desired outcome. As illustrated in FIG. 1, the calcium compound selected from calcium oxide, calcium hydroxide, or combination thereof and $CO_2$ obtained from the cement plant undergoing calcination of the limestone (step A in FIG. 1), are subjected to methods and systems provided herein to produce the precipitation material comprising calcium carbonate.

Calcination or calcining is a thermal treatment process to bring about a thermal decomposition of the limestone. Limestone is a naturally occurring mineral. The chemical composition of this mineral may vary from region to region as well as between different deposits in the same region. Therefore, the calcium oxide and/or hydroxide obtained from calcining limestone from each natural deposit may be different. Typically limestone may be composed of calcium carbonate ($CaCO_3$), magnesium carbonate ($MgCO_3$), silica ($SiO_2$), alumina ($Al_2O_3$), iron (Fe), sulphur (S) or other trace elements.

Limestone deposits are widely distributed. The limestone from the various deposits may differ in physical chemical properties and can be classified according to their chemical composition, texture and geological formation. Limestone may be classified into the following types: high calcium where the carbonate content may be composed mainly of calcium carbonate with a magnesium carbonate content not more than 5%; magnesium containing magnesium carbonate to about 5-20%; or dolomitic which may contain between 20-45% of $MgCO_3$, the balance amount is calcium carbonate. Limestones from different sources may differ considerably in chemical compositions and physical structures. It is to be understood that the methods and systems provided herein apply to all the cement plants calcining the limestone from any of the sources listed above or commercially available.

The limestone calcination is a decomposition process where the chemical reaction for decomposition of the limestone is:

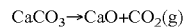

$$CaCO_3 \rightarrow CaO + CO_2(g)$$

The calcium oxide may be in dry form or in wet form (e.g. calcium hydroxide) depending on the conditions. The production of calcium oxide (lime or quick lime) may depend upon the type of kiln, conditions of the calcination and the nature of the raw material i.e. limestone. At relatively low calcination temperatures, products formed in the kiln may contain both un-burnt carbonate and lime and may be called underburnt lime. As the temperature increases, soft burnt or high reactive lime may be produced. At still higher temperatures, dead burnt or low reactive lime may be produced. Soft burnt lime is produced when the reaction front reaches the core of the charged limestone and converts all carbonate present to lime. A high productive product may be relatively soft, contains small lime crystallites and has open porous structure with an easily assessable interior. Such lime may have the optimum properties of high reactivity, high surface area and low bulk density. Increasing the degree of calcination beyond this stage may make lime crystallites to grow larger, agglomerate and sinter. This may result in a decrease in surface area, porosity and reactivity and an increase in bulk density. This product may be known as dead burnt or low reactive lime. Without being limited by any theory, the methods and systems provided herein utilize any one or the combination of the aforementioned lime.

Production of calcium compound by calcining limestone may be carried out using various types of kilns, such as, but not limited to, a shaft kiln or a rotary kiln. These apparatus for calcining are suitable for calcining limestone in the form of lumps having diameters of several to tens millimeters. Cement plant waste streams include waste streams from both wet process and dry process plants, which plants may employ shaft kilns or rotary kilns, and may include precalciners. These industrial plants may each burn a single fuel, or may burn two or more fuels sequentially or simultaneously.

As illustrated in FIG. 1, the limestone obtained from a limestone quarry is subjected to calcination in a cement plant resulting in the formation of the calcium compound selected from calcium oxide, calcium hydroxide, or combination thereof and $CO_2$ gas. The calcium compound may be calcium oxide in the form of a solid from dry kilns/cement processes and/or may be a combination of calcium oxide and calcium hydroxide in the form of slurry in wet kilns/cement processes. When wet the calcium oxide (also known as a base anhydride that converts to its hydroxide form in water) may be present in its hydrated form such as but not limited to, calcium hydroxide. While calcium hydroxide (also called slaked lime) is a common hydrated form of calcium oxide, other intermediate hydrated and/or water complexes may also be present in the slurry, and are all included within the scope of the methods and systems provided herein.

In the methods and systems provided herein, the calcium compound obtained from the cement plant is treated or solvated with the solubilizer, such as the N-containing salt to improve its solubility (step B in FIG. 1). The "treating" or "solvating" or "solubilizing" or its grammatical equivalents are used interchangeably herein and include solubilization of the calcium compound in aqueous medium. In some embodiments, the calcium compound slurry obtained from the wet process cement plant may be optionally subjected to dewatering step (not shown in the figure) where the residual water may be removed and the dewatered residue may be subjected to further treatment such as solvation with solubilizer such as the N-containing salts. The calcium compound slurry may be dewatered using any technique such as, but not limited to, centrifugation.

Calcium oxide may be sparingly soluble in water. In the methods and systems provided herein, the calcium oxide solubility is increased by its treatment with solubilizers such as the N-containing salt and/or borates. In some embodiments, the calcium compound is treated with the N-containing salt.

For illustration purposes only, the N-containing salt solution is being illustrated in the figures as ammonium chloride ($NH_4Cl$) solution and the subsequent calcium salt is bring illustrated as calcium chloride ($CaCl_2$). Various examples of the N-containing salts have been provided herein and are all within the scope of the invention.

In some embodiments of the aforementioned aspects and embodiments, the N-containing salt is N-containing inorganic salt, N-containing organic salt, or combination thereof. The "N-containing salt" as used herein, is a salt that partially or fully or substantially solubilizes or dissolves the calcium compound obtained after the calcination of the limestone. The calcium compound may be calcium oxide, calcium hydroxide, any other derivative of calcium, or combinations thereof.

The "N-containing inorganic salt" as used herein includes any inorganic salt with nitrogen in it. Examples of N-containing inorganic salt include, but not limited to, ammonium halide (halide is any halogen), ammonium acetate, ammonium sulfate, ammonium sulfite, ammonium nitrate, ammonium nitrite, and the like. In some embodiments, the ammonium halide is ammonium chloride or ammonium bromide. In some embodiments, the ammonium halide is ammonium chloride. Such chemicals are well known in the art and are commercially available.

The "N-containing organic salt" as used herein includes any salt of an organic compound with nitrogen in it. Examples of N-containing organic compounds include, but not limited to, aliphatic amine, alicyclic amine, heterocyclic amine, and combinations thereof. Such chemicals are well known in the art and are commercially available.

The "aliphatic amine" as used herein includes any alkyl amine of formula $(R)_n$-$NH_{3-n}$ where n is an integer from 1-3, wherein R is independently between C1-C8 linear or branched and substituted or unsubstituted alkyl. An example of the corresponding salt of the alkyl amine of formula $(R)_n$-$NH_{3-n}$ is $(R)_n$-$NH_{4-n}^+Cl^-$ or $(R)_n$-$NH_{4-n}^+Br^-$. In some embodiments, when R is substituted alkyl, the substituted alkyl is independently substituted with halogen, hydroxyl, acid and/or ester.

For example, when R is alkyl in $(R)_n$-$NH_{3-n}$, the alkyl amine can be a primary alkyl amine, such as for example only, methylamine, ethylamine, butylamine, pentylamine, etc.; the alkyl amine can be a secondary amine, such as for example only, dimethylamine, diethylamine, methylethylamine, etc.; and/or the alkyl amine can be a tertiary amine, such as for example only, trimethylamine, triethylamine, etc.

For example, when R is substituted alkyl substituted with hydroxyl in $(R)_n$-$NH_{3-n}$, the substituted alkyl amine is an alkanolamine including, but not limited to, monoalkanolamine, dialkanolamine, or trialkanolamine, such as e.g. monoethanolamine, diethanolamine, or triethanolamine, etc.

For example, when R is substituted alkyl substituted with halogen in $(R)_n$-$NH_{3-n}$, the substituted alkyl amine is, for example, chloromethylamine, bromomethylamine, chloroethylamine, bromoethylamine, etc.

For example, when R is substituted alkyl substituted with acid in $(R)_n$-$NH_{3-n}$, the substituted alkyl amine is, for example, amino acids. In some embodiments, the aforementioned amino acid has a polar uncharged alkyl chain, examples include without limitation, serine, threonine, asparagine, glutamine, or combinations thereof. In some embodiments, the aforementioned amino acid has a charged alkyl chain, examples include without limitation, arginine, histidine, lysine, aspartic acid, glutamic acid, or combinations thereof. In some embodiments, the aforementioned amino acid is glycine, proline, or combination thereof.

The "alicyclic amine" as used herein includes any alicyclic amine of formula $(R)_n$-$NH_{3-n}$ where n is an integer from 1-3, wherein R is independently one or more all-carbon rings which may be either saturated or unsaturated, but do not have aromatic character. Alicyclic compounds may have one or more aliphatic side chains attached. An example of the corresponding salt of the alicyclic amine of formula $(R)_n$-$NH_{3-n}$ is $(R)_n$-$NH_{4-n}^+Cl^-$. Examples of alicyclic amine include, without limitation, cycloalkylamine: cyclopropylamine, cyclobutylamine, cyclopentylamine, cyclohexylamine, cycloheptylamine, cyclooctylamine, and so on.

The "heterocyclic amine" as used herein includes at least one heterocyclic aromatic ring attached to at least one amine. Examples of heterocyclic rings include, without limitation, pyrrole, pyrrolidine, pyridine, pyrimidine, etc. Such chemicals are well known in the art and are commercially available.

In some embodiments, other examples of the solubilizer (used alone or in combination with the N-containing salts) include borate. Examples of borate include, without limitation, borax, colemanite, ulexite, kernite, boracite, painite, or combinations thereof.

As illustrated in step B of FIG. 1, the N-containing salt is exemplified as ammonium chloride ($NH_4Cl$). It is to be understood that $NH_4Cl$ is for illustration purposes only and that any other N-containing salt (or any borate) can be used in the methods and systems provided herein. One or more steps may be omitted or modified or the order of the steps may be changed in FIG. 1. The calcium oxide and hydroxide is solvated or solubilized by treatment with $NH_4Cl$ (new and recycled as further explained below) when the reaction that may occur is:

$$CaO(s) + 2NH_4Cl(aq) \rightarrow 2NH_3(aq) + CaCl_2(aq) + H_2O(l)$$

$$Ca(OH)_2 + 2NH_4Cl(aq) \rightarrow 2NH_3 + CaCl_2 + 2H_2O$$

In some embodiments, the N-containing salt such as, but not limited to, ammonium chloride solution may be supplemented with anhydrous ammonia or an aqueous solution of ammonia to maintain an optimum level of ammonium chloride in the solution.

In some embodiments, the amount of the N-containing salt such as, N-containing inorganic salt, N-containing organic salt, or combinations thereof is in 30% excess to the calcium compound. In some embodiments, the N-containing salt is in a ratio of between 0.5:1 to 4:1 (N-containing salt (or borate):calcium compound) or 0.5:1 to 2:1 or 0.5:1 to 1.5:1 or 1:1 to 1.5:1 or 2:1 to 4:1 or 2:1 to 3:1 or 2.5:1 to 3:1 or 3:1 to 4:1, or 1.5:1, or 2:1, or 2.5:1, or 3:1, or 3.5:1, or 4:1 with calcium compound. In some embodiments, the N-containing salt such as, N-containing inorganic salt, is in a ratio of between 0.5:1 to 4:1 (N-containing inorganic salt:calcium compound) or 0.5:1 to 2:1 or 0.5:1 to 1.5:1 or 1:1 to 1.5:1 or 2:1 to 4:1 or 2:1 to 3:1 or 2.5:1 to 3:1 or 3:1 to 4:1, or 2:1, or 3:1, or 4:1 with calcium compound. In some embodiments, the aforementioned ratios or such ratios herein are molar ratios or wt % ratios.

In some embodiments of the methods described herein, no polyhydroxy compounds are used to form the precipitation material and/or the products provided herein.

Agitation may be used to effect treatment of the calcium compound, for example, by eliminating hot and cold spots. In some embodiments, the concentration of the calcium compound in water may be between 1 and 10 g/L, 10 and 20 g/L, 20 and 30 g/L, 30 and 40 g/L, 40 and 80 g/L, 80 and 160 g/L, 160 and 320 g/L, 320 and 640 g/L, or 640 and 1280 g/L. To optimize the purification/solvation of the calcium compound, high shear mixing, wet milling, and/or sonication may be used to break open the calcium compound. During or after high shear mixing and/or wet milling, the calcium compound suspension may be treated with the N-containing salt and then further contacted with the carbon dioxide from the exhaust of the cement kiln (as shown in FIG. 1).

In some embodiments, the treatment of the calcium compound with the N-containing salt (e.g. ammonium chloride) and optionally ammonia results in the formation of an aqueous solution of calcium salt, N-containing salt, and optionally solids. In some embodiments, the solid insoluble impurities may be removed from the aqueous solution of calcium chloride before the aqueous solution is treated with carbon dioxide in the process (step C in FIG. 1). The solids may optionally be removed from the aqueous solution by filtration and/or centrifugation techniques.

In some embodiments, the solid impurity may not be removed from the aqueous solution (not shown in FIG. 1) and the aqueous solution containing calcium salts as well as the solids are contacted with the carbon dioxide to form the precipitates. In such embodiments, the precipitation material further comprises solids.

In some embodiments, the solids obtained from the solvation of the calcium compound (shown as insoluble impurities in FIG. 1) are calcium depleted solids and may be used as a cement substitute (such as a substitute for Portland cement).

In some embodiments, the solids are between 1-40 wt %; or between 1-30 wt %; or between 1-20 wt %; or between 1-10 wt % or between 1-5 wt %; or between 1-2 wt %, in the aqueous solution, in the precipitation material, or combination thereof.

As illustrated in step D in FIG. 1, the following reaction takes place when an aqueous solution comprising calcium salt (and optionally solids) is contacted with carbon dioxide from the cement plant:

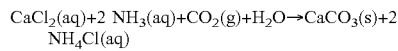

$CaCl_2(aq)+2\ NH_3(aq)+CO_2(g)+H_2O \rightarrow CaCO_3(s)+2\ NH_4Cl(aq)$

The absorption of the $CO_2$ into the solution produces $CO_2$-charged water containing carbonic acid, a species in equilibrium with both bicarbonate and carbonate. The precipitation material is prepared under one or more precipitation conditions (as described herein) suitable to form vaterite containing or PCC material.

The aqueous solution of calcium salt, from the treatment of the calcium compound with the N-containing salt such as an ammonium salt, is contacted with $CO_2$ from the cement plant at any time before, during, or after the calcium salt is subjected to one or more precipitation conditions (i.e., conditions allowing for precipitation of the precipitation material). Accordingly, in some embodiments, an aqueous solution of calcium salt solution is contacted with the $CO_2$ prior to subjecting the aqueous solution to precipitation conditions that favor formation of the precipitation material comprising stable or reactive vaterite or PCC. In some embodiments, an aqueous solution of calcium salt solution is contacted with the $CO_2$ while the aqueous solution is being subjected to precipitation conditions that favor formation of the precipitation material comprising stable or reactive vaterite or PCC. In some embodiments, an aqueous solution of calcium salt solution is contacted with the $CO_2$ prior to and while subjecting the aqueous solution to precipitation conditions that favor formation of the precipitation material comprising stable or reactive vaterite or PCC. In some embodiments, an aqueous solution of calcium salt solution is contacted with the $CO_2$ after subjecting the aqueous solution to precipitation conditions that favor formation of the precipitation material comprising stable or reactive vaterite or PCC.

In some embodiments, the contacting of the aqueous solution comprising calcium salt with carbon dioxide from the cement plant is achieved by contacting the aqueous solution to achieve and maintain a desired pH range, a desired temperature range, and/or desired divalent cation concentration using a convenient protocol as described herein. In some embodiments, the systems include a precipitation reactor configured to contact the aqueous solution comprising calcium salt with carbon dioxide from the cement plant.

In some embodiments, the aqueous solution comprising calcium salt may be placed in a precipitation reactor holding water, wherein the amount of the aqueous solution comprising calcium salt added is sufficient to raise the pH to a desired level (e.g., a pH that induces precipitation of the precipitation material) such as pH 7-14, pH 7.5-8.5, pH 7-8, pH 8-14, pH 9-14, pH 10-14, pH 11-14, pH 12-14, or pH 13-14. In some embodiments, the pH of the aqueous solution, comprising calcium salt when contacted with the carbon dioxide, is maintained at between 7-8.5 or between 7.5-8.5 or between 7-8, or between 7.6-8.5, or between 8-8.5, or between 7.5-9.5 in order to form the precipitation material comprising stable vaterite, reactive vaterite or PCC.

In some embodiments, the aqueous solution is immobilized in a column or bed. In such embodiments, water is passed through or over an amount of the calcium salt solution sufficient to raise the pH of the water to a desired pH or to a particular divalent cation ($Ca^{2+}$) concentration. In some embodiments, the aqueous solution may be cycled more than once, wherein a first cycle of precipitation removes primarily calcium carbonate minerals and leaves an alkaline solution to which additional aqueous solution comprising calcium salt may be added. Carbon dioxide, when contacted with the recycled solution of the aqueous solution, allows for the precipitation of more calcium carbonate and/or bicarbonate compounds. It will be appreciated that, in these embodiments, the aqueous solution following the first cycle of precipitation may be contacted with the $CO_2$ before, during, and/or after aqueous solution comprising calcium salt has been added. In these embodiments, the water may be recycled or newly introduced. As such, the order of addition of $CO_2$ and the aqueous solution comprising calcium salt may vary. For example, the aqueous solution comprising calcium salt may be added to, for example, brine, seawater, or freshwater, followed by the addition of $CO_2$. In another example, $CO_2$ may be added to, for example, brine, seawater, or freshwater, followed by the addition of the aqueous solution comprising calcium salt.

The aqueous solution comprising calcium salt may be contacted with the $CO_2$ using any convenient protocol. Where the $CO_2$ is a gas, contact protocols of interest include, but not limited to, direct contacting protocols (e.g., bubbling the $CO_2$ gas through the aqueous solution), concurrent contacting means (i.e., contact between unidirectional flowing gaseous and liquid phase streams), countercurrent means (i.e., contact between oppositely flowing gaseous and liquid phase streams), and the like. As such, contact may be accomplished through use of infusers, bubblers, fluidic Venturi reactors, spargers, gas filters, sprays, trays, or packed column reactors, and the like, in the precipitation reactor. In some embodiments, gas-liquid contact is accomplished by forming a liquid sheet of solution with a flat jet nozzle, wherein the $CO_2$ gas and the liquid sheet move in countercurrent, co-current, or crosscurrent directions, or in any other suitable manner. In some embodiments, gas-liquid contact is accomplished by contacting liquid droplets of solution having an average diameter of 500 micrometers or less, such as 100 micrometers or less, with a $CO_2$ gas source.

The gaseous stream of $CO_2$ from the cement plant may be substantially pure $CO_2$ or comprise multiple components that include $CO_2$ and one or more additional gases and/or other substances such as ash and other particulates. A portion of the gaseous $CO_2$ waste stream (i.e., not the entire gaseous waste stream) from the cement plant may be used to produce the precipitation material. In some embodiments, the portion of the gaseous $CO_2$ waste stream that is employed in precipitation of precipitation material may be 75% or less, such as 60% or less, and including 50% and less of the gaseous waste stream. In yet other embodiments, substantially (e.g., 80% or more) the entire gaseous $CO_2$ waste stream produced by the cement plant is employed in precipitation of the precipitation material.

Any number of the gas-liquid contacting protocols described herein may be utilized. Gas-liquid contact is continued until the pH of the precipitation reaction mixture is optimum (various optimum pH values have been described herein to form the precipitation material comprising e.g. reactive vaterite), after which the precipitation reaction mixture is allowed to stir. The rate at which the pH drops may be controlled by addition of more of the aqueous solution comprising calcium salt during gas-liquid contact. In addition, additional aqueous solution may be added after sparging to raise the pH back to basic levels for precipitation of a portion or all of the precipitation material. In any case, the precipitation material may be formed upon removing protons from certain species (e.g., carbonic acid, bicarbonate, hydronium) in the precipitation reaction mixture. The precipitation material comprising carbonates may then be separated and, optionally, further processed.

The rate at which the pH drops may be controlled by addition of additional supernatant or the aqueous solution comprising calcium salt during gas-liquid contact. In addition, additional supernatant or the aqueous solution comprising calcium salt may be added after gas-liquid contact to raise the pH back to basic levels (e.g. between 7-9 or between 7-8.5 or between 7-8) for precipitation of a portion or all of the precipitation material.

In some embodiments, the gas leaving the absorber or the precipitation reactor (shown as "scrubbed gas" in FIG. 1) passes to a gas treatment unit for a scrubbing process. The mass balance and equipment design for the gas treatment unit may depend on the properties of the gases. In some embodiments, the gas treatment unit may incorporate an HCl scrubber for recovering the small amounts of $NH_3$ in the gas exhaust stream that may be carried from the $CO_2$ absorption, precipitation step by the gas. $NH_3$ may be captured by the HCl solution through:

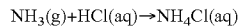

The $NH_4Cl$ (aq) from the HCl scrubber may be recycled to the solvation step B.

In some embodiments, the gas exhaust stream comprising ammonia (shown as "scrubbed gas" in FIG. 1) may be subjected to a scrubbing process where the gas exhaust stream comprising ammonia is scrubbed with the carbon dioxide from the industrial process and water to produce a solution of ammonia. The inlets for the scrubber may be carbon dioxide ($CO_{2(g)}$, the reactor gas exhaust containing ammonia ($NH_{3(g)}$, and fresh makeup water (or some other dilute water stream). The outlet may be a slipstream of the scrubber's recirculating fluid (e.g. $H_3N\text{-}CO_{2(aq)}$ or carbamate), which may optionally be returned back to the main reactor for contacting with carbon dioxide and precipitation. The pH of the system may be controlled by regulating the flow rate of $CO_{2(g)}$ into the scrubber. The conductivity of the system may be controlled by addition of dilute makeup water to the scrubber. Volume may be maintained constant by using a level detector in the scrubber or it's reservoir. While ammonia is a basic gas, the carbon dioxide gases are acidic gases. In some embodiments, the acidic and basic gases may ionize each other to increase their solubilities.

Without being limited by any theory, it is contemplated that the following reaction may take place:

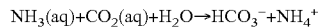

The aqueous solution comprising calcium salt when contacted with the $CO_2$ gas results in the precipitation of the calcium carbonate. The one or more precipitation conditions that result in the formation of the stable or reactive vaterite or PCC in this process have been described herein below. In some embodiments, the precipitation material comprises stable vaterite and/or reactive vaterite or PCC. The "stable vaterite" or its grammatical equivalent as used herein includes vaterite that does not transform to aragonite or calcite during and/or after dissolution-reprecipitation process in water. The "reactive vaterite" or "activated vaterite" or its grammatical equivalent as used herein, includes vaterite that results in aragonite formation during and/or after dissolution-reprecipitation process in water. The "precipitated calcium carbonate" or "PCC" as used herein includes conventional PCC with high purity and micron or lesser size particles. The PCC can be in any polymorphic form of calcium carbonate including but not limited to vaterite, aragonite, calcite, or combination thereof. In some embodiments, the PCC has a particle size in nanometers or between 0.001 micron to 5 micron.

The precipitation material comprising reactive vaterite (optionally including solids) undergoes transformation to aragonite and sets and hardens into cementitious products (shown as products (A) in FIG. 1), the solids may get incorporated in the cementitious products. This provides an additional advantage of one less step of removal of the solids, minimizing $NH_4Cl$ loss as well as eliminating a potential waste stream thereby increasing the efficiency and improving the economics of the process. In some embodiments, the solid impurities do not adversely affect the transformation and/or reactivity of the vaterite to aragonite. In some embodiments, the solid impurities do not adversely affect the strength (such as compressive strength or flexural strength) of the cementitious products.

In some embodiments, the above recited methods further include separating the precipitation material (e.g. dewatering) from the aqueous solution (called calcium carbonate cake in FIG. 1) by dewatering, optionally rinsing, and optionally drying. The precipitated material may then be used to make cementitious or non-cementitious products (shown as products (B) in FIG. 1).

In some embodiments, the vaterite in the precipitation material may be formed under suitable conditions so that the vaterite is reactive and transforms to aragonite upon dissolution-precipitation process (during cementation) in water. The aragonite may impart one or more unique characteristics to the product including, but not limited to, high compressive strength, complex microstructure network, neutral pH etc. In some embodiments, the vaterite in the precipitation material may be formed under suitable conditions so that the vaterite is stable and is used as filler in various applications. In some embodiments, the PCC in the precipitation material may be formed under suitable conditions so that the PCC is highly pure and is of a very small size particle.

In some embodiments, the calcium carbonate cake, as described above, may contain impurities (e.g., 1-2% by weight or more) of ammonium ($NH_4^+$) ions, sulfur ions, and/or chloride ($Cl^-$) ions. While rinsing of the filter cake of the precipitated $CaCO_3$, as described above, may remove some or all of the N-containing salts and/or sulfur compounds, it may result in a dilute concentration of the N-containing salts (in the supernatant) which may need concentrating before recycling it back to the process.

The calcium carbonate slurry may be subjected to dewatering and optionally rinsed to form calcium carbonate slurry (with reduced water) or calcium carbonate cake (as illustrated in FIG. 1) and the water containing residual N-containing salt solution e.g. the ammonium salt solution. The residual N-containing salt solution obtained from the dewatering as well as the rinsing stream may optionally be concentrated before being recycled back for the solvation treatment with the calcium compound. Additional N-containing salt and/or ammonia (anhydrous or aqueous solution) may be added to the recycled solution to make up for the loss of the N-containing salt during the process and bring the concentration of the N-containing salt to the optimum level.

In some embodiments, the residual N-containing salt such as e.g. the ammonium chloride solution illustrated in FIG. 1, may be recovered from the supernatant aqueous solution and concentrated using recovery process, such as, but not limited to, thermal decomposition, pH adjustment, reverse osmosis, multi-stage flash, multi-effect distillation, vapor recompression, distillation, or combinations thereof. The systems configured to carry out these processes are available commercially. For example, the pH of the solution may be raised (e.g. with a strong base like NaOH). This may shift the equilibrium towards volatile ammonia ($NH_3(aq)/NH_3(g)$). Rates and total removal could both be improved by heating the solution.

In some embodiments, the residual N-containing salt may be separated and recovered from the calcium carbonate precipitate by thermal decomposition process. This process may be incorporated in the process illustrated in FIG. 1 at the separation of the $CaCO_3$ precipitate (step E) and/or after the step of the dried $CaCO_3$ precipitate or powder (step F).

Typically, at 338° C., solid $NH_4Cl$ may decompose into ammonia ($NH_3$) and hydrogen chloride (HCl) gases. While at 840° C., solid $CaCO_3$ decomposes to calcium oxide (CaO) solid and carbon dioxide ($CO_2$) gas.

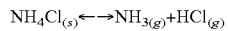

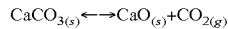

In some embodiments, the residual N-containing salt in the $CaCO_3$ precipitate and/or dried $CaCO_3$ precipitate such as, but not limited to, ammonium chloride, ammonium acetate, ammonium sulfate, ammonium sulfite, ammonium hydrosulfide, ammonium thiosulfate, ammonium nitrate, ammonium nitrite, or combinations thereof may be removed by thermal decomposition at a temperature between 150-360° C. or between 150-200° C. or between 150-300° C. or between 300-850° C. or between 338-840° C. This may be done either during the normal filter cake drying process and/or as a second post-drying heat treatment. A temperature range is desirable that decomposes residual N-containing salt in the precipitation while preserving the cementitious properties of the reactive vaterite in the precipitation material such that the reactive vaterite stays as reactive vaterite after heating, and after combination with water, successfully transforms to aragonite to form cementitious products. In some embodiments of the foregoing aspect and embodiments, the step (iii) of removing and optionally recovering the residual N-containing salt from the precipitation material comprises heating the precipitation material between about 150-375° C. or between about 150-300° C. or between about 290-375° C. or between about 300-360° C. or between about 300-350° C. or between about 310-345° C. or between about 320-345° C. or between about 330-345° C. or between about 300-345° C., to evaporate the N-containing salt from the precipitation material with optional recovery by condensation of the N-containing salt. In some embodiments of the foregoing aspect and embodiments, the step (iii) of removing and optionally recovering the residual N-containing salt from the precipitation material comprises heating the precipitation material, for a duration of more than about 10 min or of more than about 15 min or for than about 5 min or of between about 10 min to about 1 hour or of between about 10 min to about 1.5 hour or of between about 10 min to about 2 hours or of between about 10 min to about 5 hours or of between about 10 min to about 10 hours.

In some embodiments, the precipitation material is dewatered (to remove the supernatant aqueous solution) and dried to remove water (e.g. by heating at about or above 100° C.) before subjecting the precipitation material to the heating step (iii) to remove and optionally recover the N-containing salt. In some embodiments, the precipitation material is partially dewatered (to remove bulk of the supernatant aqueous solution) and partially dried to remove water (or avoid the drying step) before subjecting the precipitation material to the heating step (iii) to remove and optionally recover the N-containing salt. In some embodiments, the reactive vaterite in the precipitation material stays as reactive vaterite after heating. In some embodiments of the foregoing embodiments, it is desirable that the reactive vaterite in the precipitation material stays as reactive vaterite such that the cementitious properties of the material are conserved. In some embodiments, the N-containing salt evaporates from the precipitation material in a form comprising ammonia gas, hydrogen chloride gas, chlorine gas, or combinations thereof. Applicants have found that in some embodiments, maintaining a combination of the amount of temperature and duration of heating may be critical to removing the N-containing salt from the precipitation material yet preserving the cementitious properties of the reactive vaterite material. Traditionally, reactive vaterite is highly unstable and transforms readily to aragonite/calcite. However, Applicants have found temperature ranges coupled optionally with duration of heating that minimizes the transformation of the reactive vaterite yet removes residual N-containing salt from the material. In some embodiments of the foregoing embodiments, the vaterite in the precipitation material, after removal of the N-containing salt, stays as reactive vaterite which when combined with water transforms to aragonite (dissolution-reprecipitation process) which sets and cements to form cementitious products. The cementitious products, thus formed, possess minimal or no chloride content and have no foul smell of ammonia or sulfur. In some embodiments, the chloride content is around or below acceptable ASTM standards for the cementitious products.

In some embodiments, the above recited temperature conditions optionally coupled with duration of heating, may be combined with pressure conditions that provide a driving force to improve the thermodynamics of the decomposition of the residual N-containing salt. For example, the heating of the precipitation material may be carried out in a system in which the headspace is at a pressure lower than atmospheric pressure. The pressure lower than the atm pressure may create a driving force for heating reaction that involves gas phase products (such as, but not limited to, ammonia gas, hydrogen chloride gas, chlorine gas, or combinations thereof), by reducing the partial pressure of the reactant in the vapor phase. Another advantage of operating under reduced pressure or vacuum may be that at lower pressure some sublimation reactions may occur at lower temperatures thereby improving the energy requirements of the heating reaction.

In some embodiments of the above described thermal decomposition process, the separated ammonium chloride in the form of ammonia and HCl gases, may be recovered for reuse by either recrystallization of the combined thermally evolved gases or by absorbing the gases into an aqueous medium. Both mechanisms may result in the $NH_4Cl$ product that may be concentrated enough for reuse in the process as shown in FIG. 1.

In some embodiments, the N-containing salt may be separated and recovered in the above described process (or as illustrated in FIG. 1) by pH adjusted evolution of $NH_3$ gas from the ammonium salt. This process may be incorporated in the process illustrated in FIG. 1 at the separation of the $CaCO_3$ cake. The final pH of the water in the filter cake may typically be about 7.5. At this pH, $NH_4^+$ (pKa=9.25) may be the predominant species. Increasing the pH of this water may drive the acid base equilibrium toward $NH_3$ gas, as described in the following equation:

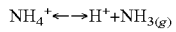

$$NH_4^+ \leftarrow\rightarrow H^+ + NH_{3(g)}$$

Any source of alkalinity may be used to increase the pH of the filter cake water. In some embodiments, the aqueous solution of the calcium oxide and/or hydroxide or the limestone slurry may provide the source of high alkalinity. In some embodiments, the aqueous fraction of the calcium compound may be integrated into the rinsing stage of the dewatering process (e.g. filter cake step) to raise the pH of the system, and drive the evolution of $NH_3$ gas. As ammonia has substantial solubility in water, heat and/or vacuum pressure may be applied to drive the equilibrium further toward the gaseous phase. The ammonia may be recovered for reuse by either recrystallization of ammonia with chloride or by absorbing the ammonia into an aqueous medium. Both mechanisms may result in the ammonia solution or $NH_4Cl$ product that may be concentrated enough for reuse in the process described in FIG. 1.

The calcium carbonate cake (e.g. vaterite or PCC) may be sent to the dryer (step F in FIG. 1) to form calcium carbonate powder containing stable or reactive vaterite or PCC. The powder form of the precipitation material comprising stable or reactive vaterite or PCC may be used further in applications to form products, as described herein. The cake may be dried using any drying techniques known in the art such as, but not limited to fluid bed dryer or swirl fluidizer. The resulting solid powder may be then mixed with additives to make different products described herein. In some embodiments, the slurry form with reduced water or the cake form of the precipitation material is directly used to form products, such as construction panel, as described herein.

Optionally the solids separated, may be dried and used as a pozzolan. In some embodiments, the solids separated may be added to the powder form of the precipitation material comprising vaterite as filler or supplementary cementitious material.

In methods provided herein, an aqueous solution comprising $CO_2$ charged water, produced by contacting the aqueous solution comprising calcium salt with $CO_2$ (both obtained from the cement plant) is subjected to one or more of precipitation conditions (step D) sufficient to produce a precipitation material comprising stable or reactive vaterite or PCC and a supernatant (i.e., the part of the precipitation reaction mixture that is left over after precipitation of the precipitation material). The one or more precipitation conditions favor production of a precipitation material comprising stable or reactive vaterite or PCC.

The precipitation conditions include those that modulate the environment of the $CO_2$ charged precipitation reaction mixture to produce the desired precipitation material comprising stable or reactive vaterite or PCC. Such one or more precipitation conditions, that can be used in the method embodiments described herein, suitable to form stable or reactive vaterite or PCC containing carbonate precipitation material include, but are not limited to, temperature, pH, pressure, ion ratio, precipitation rate, presence of additive, presence of ionic species, concentration of additive and ionic species, stirring, residence time, mixing rate, forms of agitation such as ultrasonics, presence of seed crystals, catalysts, membranes, or substrates, dewatering, drying, ball milling, etc. In some embodiments, the average particle size of the stable or the reactive vaterite or PCC may also depend on the one or more precipitation conditions used in the precipitation of the precipitation material. In some embodiments, the percentage of the stable or the reactive vaterite in the precipitation material may also depend on the one or more precipitation conditions used in the precipitation process.

For example, the temperature of the $CO_2$-charged precipitation reaction mixture may be raised to a point at which an amount suitable for precipitation of the desired precipitation material occurs. In such embodiments, the temperature of the $CO_2$ charged precipitation reaction mixture may be raised to a value, such as from 20° C. to 80° C., and including from 25° C. to 45° C. or 20° C. to 70° C. or 20° C. to 60° C. or 20° C. to 50° C. or 20° C. to 40° C. or 20° C. to 30° C. While a given set of precipitation conditions may have a temperature ranging from 0° C. to 100° C., the temperature may be raised in certain embodiments to produce the desired precipitation material. In certain embodiments, the temperature of the precipitation reaction mixture is raised using energy generated from low or zero carbon dioxide emission sources (e.g., solar energy source, wind energy source, hydroelectric energy source, waste heat from the flue gases of the carbon emitter, etc).

The pH of the $CO_2$-charged precipitation reaction mixture may also be raised to an amount suitable for precipitation of the desired precipitation material. In such embodiments, the pH of the $CO_2$-charged precipitation reaction mixture is raised to alkaline levels for precipitation, wherein carbonate is favored over bicarbonate. In some embodiments, the pH of the aqueous solution comprising calcium salt that is contacted with the carbon dioxide gas has an effect on the formation of the reactive vaterite or PCC. In some embodiments, the precipitation material conditions required to form the precipitation material comprising reactive vaterite or PCC include conducting the contacting step of the carbon dioxide with the aqueous solution comprising calcium salt at pH higher than 7 or pH of 8 or pH of between 7.1-8.5 or pH of between 7.5-8 or between 7.5-8.5 or between 8-8.5 or between 7.6-8.4, in order to form the reactive vaterite or PCC. The pH may be raised to pH 9 or higher, such as pH 10 or higher, including pH 11 or higher or pH 12.5 or higher.

Adjusting major ion ratios during precipitation may influence the nature of the precipitation material. Major ion ratios may have considerable influence on polymorph formation. For example, as the magnesium:calcium ratio in the water increases, aragonite may become the major polymorph of calcium carbonate in the precipitation material over low-magnesium vaterite. At low magnesium:calcium ratios, low-magnesium calcite may become the major polymorph. In some embodiments, where $Ca^{2+}$ and $Mg^{2+}$ are both present, the ratio of $Ca^{2+}$ to $Mg^{2+}$ (i.e., $Ca^{2+}:Mg^{2+}$) in the precipitation material is 1:1 to 1:2.5; 1:2.5 to 1:5; 1:5 to 1:10; 1:10 to 1:25; 1:25 to 1:50; 1:50 to 1:100; 1:100 to 1:150; 1:150 to 1:200; 1:200 to 1:250; 1:250 to 1:500; or 1:500 to 1:1000. In some embodiments, the ratio of $Mg^{2+}$ to $Ca^{2+}$ (i.e., $Mg^{2+}:Ca^{2+}$) in the precipitation material is 1:1 to 1:2.5; 1:2.5 to 1:5; 1:5 to 1:10; 1:10 to 1:25; 1:25 to 1:50; 1:50 to 1:100; 1:100 to 1:150; 1:150 to 1:200; 1:200 to 1:250; 1:250 to 1:500; or 1:500 to 1:1000.

Precipitation rate may also have an effect on compound phase formation, with the most rapid precipitation rate achieved by seeding the solution with a desired phase. Without seeding, rapid precipitation may be achieved by rapidly increasing the pH of the precipitation reaction mixture, which may result in more amorphous constituents. The higher the pH, the more rapid is the precipitation, which may result in a more amorphous precipitation material.

Residence time of the reaction mixture after contacting the aqueous solution with the $CO_2$ may also have an effect on compound phase formation. For example, in some embodiments, a longer residence time may result in transformation of the reactive vaterite to aragonite/calcite within the reaction mixture. In some embodiments, too short residence time may result in an incomplete formation of the reactive vaterite in the reaction mixture. Therefore, the residence time may be critical to the precipitation of the reactive vaterite. Further, the residence time may also affect the particle size of the precipitate. For example, too long residence time may result in the agglomeration of the particles forming large size particles which is undesirable for PCC formation. Therefore, in some embodiments, the residence time of the reaction is between about 10 min to 1 hour, or between about 15 min-60 min, or between about 15 min-45 min, or between about 15 min-30 min, or between about 30 min-60 min.

In some embodiments, a set of precipitation conditions to produce a desired precipitation material from a precipitation reaction mixture may include, as above, the temperature and pH, as well as, in some instances, the concentrations of additives and ionic species in the water. The additives have been described herein below. The presence of the additives and the concentration of the additives may also favor formation of stable or reactive vaterite or PCC. In some embodiments, a middle chain or long chain fatty acid ester may be added to the aqueous solution during the precipitation to form PCC. Examples of fatty acid esters include, without limitation, cellulose such as carboxymethyl cellulose, sorbitol, citrate such as sodium or potassium citrate, stearate such as sodium or potassium stearate, phosphate such as sodium or potassium phosphate, sodium tripolyphosphate, hexametaphosphate, EDTA, or combinations thereof. In some embodiments, a combination of stearate and citrate may be added during the contacting step of the process to from PCC.

Precipitation conditions may also include factors such as mixing rate, forms of agitation such as ultrasonics, and the presence of seed crystals, catalysts, membranes, or substrates. In some embodiments, precipitation conditions include supersaturated conditions, temperature, pH, and/or concentration gradients, or cycling or changing any of these parameters. The protocols employed to prepare precipitation material according to the invention may be batch, semi-batch, or continuous protocols. The precipitation conditions may be different to produce a given precipitation material in a continuous flow system compared to a semi-batch or batch system.

The precipitation material, following production from a precipitation reaction mixture, is separated from the reaction mixture to produce separated precipitation material (e.g., wet cake) and a supernatant as illustrated in step E in FIG. 1. In the systems provided herein, the separation step may be carried out on the separation station. The precipitation material may be stored in the supernatant for a period of time following precipitation and prior to separation (e.g., by drying). For example, the precipitation material may be stored in the supernatant for a period of time ranging from few min to hours to 1 to 1000 days or longer, such as 1 to 10 days or longer, at a temperature ranging from 1° C. to 40° C., such as 20° C. to 25° C. Separation of the precipitation material from the precipitation reaction mixture is achieved using any of a number of convenient approaches, including draining (e.g., gravitational sedimentation of the precipitation material followed by draining), decanting, filtering (e.g., gravity filtration, vacuum filtration, filtration using forced air), centrifuging, pressing, or any combination thereof. Separation of bulk water from the precipitation material produces a wet cake of precipitation material, or a dewatered precipitation material. Liquid-solid separator such as Epuramat's Extrem-Separator ("ExSep") liquid-solid separator, Xerox PARC's spiral concentrator, or a modification of either of Epuramat's ExSep or Xerox PARC's spiral concentrator, may be useful for the separation of the precipitation material from the precipitation reaction mixture.

In some embodiments, the resultant dewatered precipitation material such as the wet cake material (after thermally removing the N-containing salt) is directly used to make the products described herein. For example, the wet cake of the dewatered precipitation material is mixed with one or more additives, described herein, and is spread out on the conveyer belt where the reactive vaterite or PCC in the precipitation material transforms to aragonite and sets and hardens (and N-containing salt gets thermally removed). The hardened material is then cut into desired shapes such as boards or panels described herein. In some embodiments, the wet cake is poured onto a sheet of paper on top of the conveyer belt. Another sheet of paper may be put on top of the wet cake which is then pressed to remove excess water. After the setting and hardening of the precipitation material (vaterite transformation to aragonite), the material is cut into desired shapes, such as, cement siding boards and drywall etc. In some embodiments, the amount of the one or more additives may be optimized depending on the desired time required for the transformation of the vaterite to aragonite (described below). For example, for some applications, it may be desired that the material transform rapidly and in certain other instance, a slow transformation may be desired. In some embodiments, the wet cake may be heated on the conveyer belt to hasten the transformation of the vaterite to aragonite. In some embodiments, the wet cake may be poured in the molds of desired shape and the molds are then heated in the autoclave to hasten the transformation of the vaterite to aragonite (and to remove residual N-containing salt). Accordingly, the continuous flow process, batch process or semi-batch process, all are well within the scope of the invention.

In some embodiments, the precipitation material, once separated from the precipitation reaction mixture is washed with fresh water and then placed into a filter press to produce a filter cake with 30-60% solids. This filter cake is then mechanically pressed in a mold, using any convenient means, e.g., a hydraulic press, at adequate pressures, e.g., ranging from 5 to 5000 psi, such as 1000 to 5000 psi, to produce a formed solid, e.g., a rectangular brick. These resultant solids are then cured, e.g., by placing outside and storing, by placing in a chamber wherein they are subjected to high levels of humidity and heat, etc. These resultant cured solids are then used as building materials themselves or crushed to produce aggregate.

In processes involving the use of temperature and pressure, the dewatered precipitate cake may be dried. The cake is then exposed to a combination of re-watering and elevated temperature and/or pressure for a certain time. The combination of the amount of water added back, the temperature, the pressure, and the time of exposure, as well as the thickness of the cake, can be varied according to composition of the starting material and the desired results.

A number of different ways of exposing the material to temperature and pressure are described herein; it will be appreciated that any convenient method may be used. Thickness and size of the cake may be adjusted as desired; the thickness can vary in some embodiment from 0.05 inch to 5 inches, e.g. 0.1-2 inches, or 0.3-1 inch. In some embodiments the cake may be 0.5 inch to 6 feet or even thicker. The cake is then exposed to elevated temperature and/or pressure for a given time, by any convenient method, for example, in a platen press using heated platens. The heat to elevate the temperature, e.g., for the platens, may be provided, e.g., by heat from an industrial waste gas stream such as a flue gas stream. The temperature may be any suitable temperature; in general, for a thicker cake a higher temperature is desired; examples of temperature ranges are 40-150° C., e.g., 60-120° C., such as 70-110° C., or 80-100° C. Similarly, the pressure may be any suitable pressure to produce the desired results; exemplary pressures include 1000-100,000 pounds per square inch (psi), including 2000-50,000 psi, or 2000-25,000 psi, or 2000-20,000 psi, or 3000-5000 psi. Finally, the time that the cake is pressed may be any suitable time, e.g., 1-100 seconds, or 1-100 minute, or 1-50 minutes, or 2-25 minutes, or 1-10,000 days. The resultant hard tablet may optionally then cured, e.g., by placing outside and storing, by placing in a chamber wherein they are subjected to high levels of humidity and heat, etc. These hard tablets, optionally cured, are then used as building materials themselves or crushed to produce aggregate.

Another method of providing temperature and pressure is the use of a press. A suitable press, e.g., a platen press, may be used to provide pressure at the desired temperature (using heat supplied, e.g., by a flue gas or by other steps of the process to produce a precipitate, e.g., from an electrochemical process) for a desired time. A set of rollers may be used in similar fashion.

Another way to expose the cake to elevated temperature and pressure is by means of an extruder, e.g., a screw-type extruder. The barrel of the extruder can be outfitted to achieve an elevated temperature, e.g., by jacketing; this elevated temperature can be supplied by, e.g., flue gases or the like. Extrusion may be used as a means of pre-heating and drying the feedstock prior to a pressing operation. Such pressing can be performed by means of a compression mold, via rollers, via rollers with shaped indentations (which can provide virtually any shape of aggregate desired), between a belt which provides compression as it travels, or any other convenient method. Alternatively, the extruder may be used to extrude material through a die, exposing the material to pressure as it is forced through the die, and giving any desired shape. In some embodiments, the carbonate precipitate is mixed with fresh water and then placed into the feed section of a rotating screw extruder. The extruder and/or the exit die may be heated to further assist in the process. The turning of the screw conveys the material along its length and compresses it as the flute depth of the screw decreases. The screw and barrel of the extruder may further include vents in the barrel with decompression zones in the screw coincident with the barrel vent openings. Particularly in the case of a heated extruder, these vented areas allow for the release of steam from the conveyed mass, removing water from the material.

The screw conveyed material is then forced through a die section which further compresses the material and shapes it. Typical openings in the die can be circular, oval, square, rectangular, trapezoidal, etc., although any shape which the final aggregate is desired in could be made by adjusting the shape of the opening. The material exiting the die may be cut to any convenient length by any convenient method, such as by a fly knife. Use of a heated die section may further assist in the formation of the product by accelerating the transition of the carbonate mineral to a hard, stable form. Heated dies may also be used in the case of binders to harden or set the binder. Temperatures of 100° C. to 600° C. are commonly used in the heated die section.

In yet other embodiments, the precipitate may be employed for in situ or form-in-place structure fabrication. For example, roads, paved areas, or other structures may be fabricated from the precipitate by applying a layer of precipitate, e.g., as described above, to a substrate, e.g., ground, roadbed, etc., and then hydrating the precipitate, e.g., by allowing it to be exposed to naturally applied water, such as in the form of rain, or by irrigation. Hydration solidifies the precipitate into a desired in situ or form-in-place structure, e.g., road, paved over area, etc. The process may be repeated, e.g., where thicker layers of in-situ formed structures are desired.

In some embodiments, the production of the precipitation material and the products is carried out in the same facility. In some embodiments, the precipitation material is produced in one facility and is transported to another facility to make the end product. The precipitation material may be transported in the slurry form, wet cake form, or dry powder form.

In some embodiments, the resultant dewatered precipitation material obtained from the separation station is dried at the drying station to produce a powder form of the carbonate precipitation material comprising stable or reactive vaterite or PCC. Drying may be achieved by air-drying the precipitation material. In certain embodiments, drying is achieved by freeze-drying (i.e., lyophilization), wherein the precipitation material is frozen, the surrounding pressure is reduced, and enough heat is added to allow the frozen water in the precipitation material to sublime directly into gas. In yet another embodiment, the precipitation material is spray-dried to dry the precipitation material, wherein the liquid containing the precipitation material is dried by feeding it through a hot gas (such as the gaseous waste stream from the power plant), and wherein the liquid feed is pumped through an atomizer into a main drying chamber and a hot gas is passed as a co-current or counter-current to the atomizer direction. Depending on the particular drying protocol of the system, the drying station may include a filtration element, freeze-drying structure, spray-drying structure, etc. In some embodiments, the precipitate may be dried by fluid bed dryer. In certain embodiments, waste heat from a power plant or similar operation may be used to perform the drying step when appropriate. For example, in some embodiments, dry product is produced by the use of elevated temperature (e.g., from power plant waste heat), pressure, or a combination thereof. Following the drying of the precipitation material, the material may be then subjected to heating at elevated temperatures to remove N-containing salt as described herein.

The resultant supernatant of the precipitation process or slurry of precipitation material may also be processed as desired. For example, the supernatant or the slurry may be returned to the calcium compound aqueous solution, or to another location. In some embodiments, the supernatant may be contacted with a source of $CO_2$, as described above, to sequester additional $CO_2$. For example, in embodiments in which the supernatant is to be returned to the precipitation reactor, the supernatant may be contacted with a gaseous waste source of $CO_2$ in a manner sufficient to increase the concentration of carbonate ion present in the supernatant. As described above, contact may be conducted using any convenient protocol. In some embodiments, the supernatant has an alkaline pH, and contact with the $CO_2$ source is carried out in a manner sufficient to reduce the pH to a range between pH 5 and 9, pH 6 and 8.5, or pH 7.5 to 8.2.

In some embodiments, the precipitation material produced by the methods is employed as a building material (e.g., a construction material for some type of man-made structure such as buildings, roads, bridges, dams, and the like), such that $CO_2$ is effectively sequestered in the built environment. Any man made structure, such as foundations, parking structures, houses, office buildings, commercial offices, governmental buildings, infrastructures (e.g., pavements; roads; bridges; overpasses; walls; footings for gates, fences and poles; and the like) is considered a part of the built environment. Mortars find use in binding construction blocks (e.g., bricks) together and filling gaps between construction blocks. Mortars can also be used to fix existing structure (e.g., to replace sections where the original mortar has become compromised or eroded), among other uses.

In certain embodiments, the powder form of the precipitation material comprising reactive vaterite is employed as cement, which transforms to aragonite (the dissolution-re-precipitation process) and sets and hardens after combining with water.

In some embodiments, an aggregate is produced from the resultant precipitation material. In such embodiments, where the drying process produces particles of the desired size, little if any additional processing is required to produce the aggregate. In yet other embodiments, further processing of the precipitation material is performed in order to produce the desired aggregate. For example, the precipitation material may be combined with fresh water in a manner sufficient to cause the precipitate to form a solid product, where the reactive vaterite converts to aragonite. By controlling the water content of the wet material, the porosity, and eventual strength and density of the final aggregate may be controlled. Typically a wet cake may be 40-60 volume % water. For denser aggregates, the wet cake may be <50% water, for less dense cakes, the wet cake may be >50% water. After hardening, the resultant solid product may then be mechanically processed, e.g., crushed or otherwise broken up and sorted to produce aggregate of the desired characteristics, e.g., size, particular shape, etc. In these processes the setting and mechanical processing steps may be performed in a substantially continuous fashion or at separate times. In certain embodiments, large volumes of precipitate may be stored in the open environment where the precipitate is exposed to the atmosphere. For the setting step, the precipitate may be irrigated in a convenient fashion with fresh water, or allowed to be rained on naturally in order to produce the set product. The set product may then be mechanically processed as described above. Following production of the precipitate, the precipitate is processed to produce the desired aggregate. In some embodiment the precipitate may be left outdoors, where rainwater can be used as the freshwater source, to cause the meteoric water stabilization reaction to occur, hardening the precipitate to form aggregate.

As illustrated in FIG. 1, the methods produce precipitation material (in wet, slurry or dry form) comprising stable or reactive vaterite or PCC. The "composition," "precipitate," and "precipitation material," are used interchangeably herein. The precipitation material formed in the methods and systems provided herein after the removal of the residual N-containing salt, as described herein, comprises vaterite or PCC. The stable vaterite includes vaterite that does not transform to aragonite or calcite during and/or after dissolution-re-precipitation process. The reactive vaterite or activated vaterite includes vaterite that results in aragonite formation during and/or after dissolution-re-precipitation process. In some embodiments, the PCC formed is in vaterite form. In some embodiments, the methods described herein further include contacting the precipitation material (in dried or wet form) with water and transforming the reactive vaterite to aragonite. In some embodiments, the stable vaterite when contacted with water does not transform to aragonite and stays either in the vaterite form or transforms over a long period of time to calcite.

Figure 2:
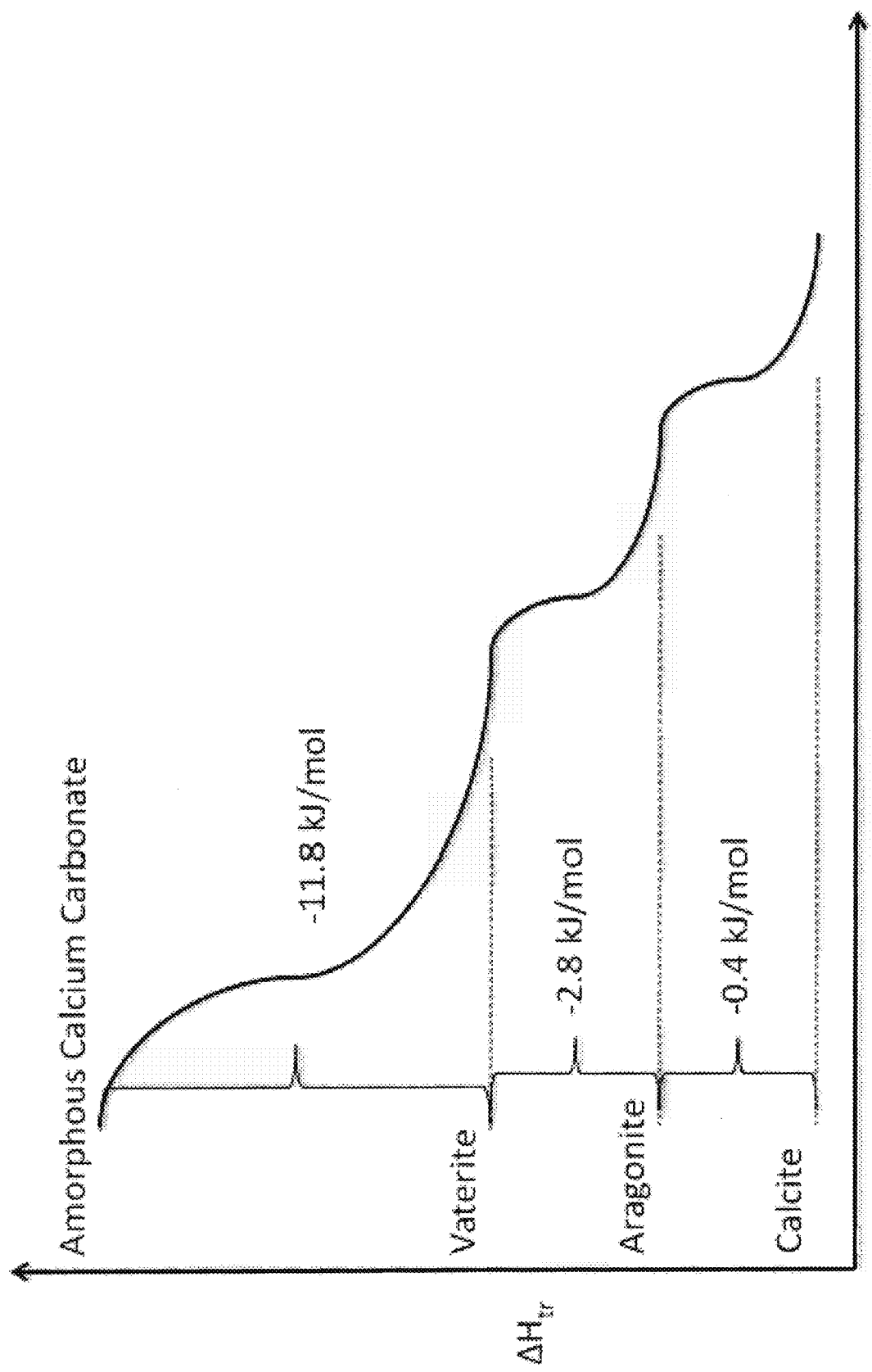
FIG. 2 illustrates a Gibbs free energy diagram of the transition from vaterite to aragonite.

Typically, upon precipitation of the calcium carbonate, amorphous calcium carbonate (ACC) may initially precipitate and transform into one or more of its three more stable phases (vaterite, aragonite, or calcite). A thermodynamic driving force may exist for the transformation from unstable phases to more stable phases, as described by Ostwald in his Step Rule (Ostwald, W. *Zeaschrift fur Physikalische Chemie* 289 (1897)). For this reason, calcium carbonate phases transform in the order: ACC to vaterite, aragonite, and calcite where intermediate phases may or may not be present. During this transformation, excesses of energy are released, as exhibited by FIG. 2. This intrinsic energy may be harnessed to create a strong aggregation tendency and surface interactions that may lead to agglomeration and setting or cementing. It is to be understood that the values reported in FIG. 2 are well known in the art and may vary.

The methods provided herein produce or isolate the precipitation material in the vaterite form or in the form of PCC which may be present in vaterite, aragonite, or calcite form. The precipitation material may be in a wet form, slurry form, or a dry powder form. This precipitation material may have a stable vaterite form that does not transform readily to any other polymorph or may have a reactive vaterite form that transforms to aragonite form. The aragonite form does not convert further to more stable calcite form. The product containing the aragonite form of the precipitate shows one or more unexpected properties, including but not limited to, high compressive strength, high porosity (low density or light weight), neutral pH (useful as artificial reef described below), microstructure network, etc.

Other minor polymorph forms of calcium carbonate that may be present in the carbonate containing precipitation material in addition to vaterite include, but not limited to, amorphous calcium carbonate, aragonite, calcite, a precursor phase of vaterite, a precursor phase of aragonite, an intermediary phase that is less stable than calcite, polymorphic forms in between these polymorphs or combination thereof.

Vaterite may be present in monodisperse or agglomerated form, and may be in spherical, ellipsoidal, plate like shape, or hexagonal system. Vaterite typically has a hexagonal crystal structure and forms polycrystalline spherical particles upon growth. The precursor form of vaterite comprises nanoclusters of vaterite and the precursor form of aragonite comprises sub-micron to nanoclusters of aragonite needles. Aragonite, if present in the composition along with vaterite, may be needle shaped, columnar, or crystals of the rhombic system. Calcite, if present in the composition along with vaterite, may be cubic, spindle, or crystals of hexagonal system. An intermediary phase that is less stable than calcite may be a phase that is between vaterite and calcite, a phase between precursor of vaterite and calcite, a phase between aragonite and calcite, and/or a phase between precursor of aragonite and calcite.

The transformation between calcium carbonate polymorphs may occur via solid-state transition, may be solution mediated, or both. In some embodiments, the transformation is solution-mediated as it may require less energy than the thermally activated solid-state transition. Vaterite is metastable and the difference in thermodynamic stability of calcium carbonate polymorphs may be manifested as a difference in solubility, where the least stable phases are the most soluble (Ostwald, supra). Therefore, vaterite may dissolve readily in solution and transform favorably towards a more stable polymorph, such as aragonite. In a polymorphic system like calcium carbonate, two kinetic processes may exist simultaneously in solution: dissolution of the metastable phase and growth of the stable phase. In some embodiments, the aragonite crystals may be growing while vaterite is undergoing dissolution in the aqueous medium.

In one aspect, the reactive vaterite may be activated such that the reactive vaterite leads to aragonitic pathway and not calcite pathway during dissolution-reprecipitation process. In some embodiments, the reactive vaterite containing composition is activated in such a way that after the dissolution-reprecipitation process, aragonite formation is enhanced and calcite formation is suppressed. The activation of the reactive vaterite containing composition may result in control over the aragonite formation and crystal growth. The activation of the vaterite containing composition may be achieved by various processes. Various examples of the activation of vaterite, such as, but not limited to, nuclei activation, thermal activation, mechanical activation, chemical activation, or combination thereof, are described herein. In some embodiments, the vaterite is activated through various processes such that aragonite formation and its morphology and/or crystal growth can be controlled upon reaction of vaterite containing composition with water. The aragonite formed results in higher tensile strength and fracture tolerance to the products formed from the reactive vaterite.

In some embodiments, the reactive vaterite may be activated by mechanical means, as described herein. For example, the reactive vaterite containing compositions may be activated by creating surface defects on the vaterite composition such that the aragonite formation is accelerated. In some embodiments, the activated vaterite is a ball-milled reactive vaterite or is a reactive vaterite with surface defects such that aragonite formation pathway is facilitated.

The reactive vaterite containing compositions may also be activated by providing chemical or nuclei activation to the vaterite composition. Such chemical or nuclei activation may be provided by one or more of aragonite seeds, inorganic additive, or organic additive. The aragonite seed present in the compositions provided herein may be obtained from natural or synthetic sources. The natural sources include, but not limited to, reef sand, limestone, hard skeletal material of certain fresh-water and marine invertebrate organisms, including pelecypods, gastropods, mollusk shell, and calcareous endoskeleton of warm- and cold-water corals, pearls, rocks, sediments, ore minerals (e.g., serpentine), and the like. The synthetic sources include, but not limited to, precipitated aragonite, such as formed from sodium carbonate and calcium chloride; or aragonite formed by the transformation of vaterite to aragonite, such as transformed vaterite described herein.

In some embodiments, the inorganic additive or the organic additive in the compositions provided herein can be any additive that activates reactive vaterite. Some examples of inorganic additive or organic additive in the compositions provided herein, include, but not limited to, sodium decyl sulfate, lauric acid, sodium salt of lauric acid, urea, citric acid, sodium salt of citric acid, phthalic acid, sodium salt of phthalic acid, taurine, creatine, dextrose, poly(n-vinyl-1-pyrrolidone), aspartic acid, sodium salt of aspartic acid, magnesium chloride, acetic acid, sodium salt of acetic acid, glutamic acid, sodium salt of glutamic acid, strontium chloride, gypsum, lithium chloride, sodium chloride, glycine, sodium citrate dehydrate, sodium bicarbonate, magnesium sulfate, magnesium acetate, sodium polystyrene, sodium dodecylsulfonate, poly-vinyl alcohol, or combination thereof. In some embodiments, inorganic additive or organic additive in the compositions provided herein, include, but not limited to, taurine, creatine, poly(n-vinyl-1-pyrrolidone), lauric acid, sodium salt of lauric acid, urea, magnesium chloride, acetic acid, sodium salt of acetic acid, strontium chloride, magnesium sulfate, magnesium acetate, or combination thereof. In some embodiments, inorganic additive or organic additive in the compositions provided herein, include, but not limited to, magnesium chloride, magnesium sulfate, magnesium acetate, or combination thereof.

Without being limited by any theory, it is contemplated that the activation of vaterite by ball-milling or by addition of aragonite seed, inorganic additive or organic additive or combination thereof may result in control of formation of aragonite during dissolution-reprecipitation process of the activated reactive vaterite including control of properties, such as, but not limited to, polymorph, morphology, particle size, cross-linking, agglomeration, coagulation, aggregation, sedimentation, crystallography, inhibiting growth along a certain face of a crystal, allowing growth along a certain face of a crystal, or combination thereof. For example, the aragonite seed, inorganic additive or organic additive may selectively target the morphology of aragonite, inhibit calcite growth and promote the formation of aragonite that may generally not be favorable kinetically.

In some embodiments, one or more inorganic additives may be added to facilitate transformation of vaterite to aragonite. The one or more additives may be added during any step of the process. For example, the one or more additives may be added during contact of the calcium compound solution with carbon dioxide, after contact of the calcium compound solution with carbon dioxide, during precipitation of the precipitation material, after precipitation of the precipitation material in the slurry, in the slurry after the dewatering of the precipitation material, in the powder after the drying of the slurry, in the aqueous solution to be mixed with the powder precipitation material, or in the slurry made from the powdered precipitation material with water, or any combination thereof. In some embodiments, the water used in the process of making the precipitation material may already contain the one or more additives or the one or more additive ions. For example, if sea water is used in the process, then the additive ion may already be present in the sea water.

In some embodiments, in the foregoing methods, the amount of the one or more additives added during the process is more than 0.1% by weight, or more than 0.5% by weight, or more than 1% by weight, or more than 1.5% by weight, or more than 1.6% by weight, or more than 1.7% by weight, or more than 1.8% by weight, or more than 1.9% by weight, or more than 2% by weight, or more than 2.1% by weight, or more than 2.2% by weight, or more than 2.3% by weight, or more than 2.4% by weight, or more than 2.5% by weight, or more than 2.6% by weight, or more than 2.7% by weight, or more than 2.8% by weight, or more than 2.9% by weight, or more than 3% by weight, or more than 3.5% by weight, or more than 4% by weight, or more than 4.5% by weight, or more than 5% by weight, or between 0.5-5% by weight, or between 0.5-4% by weight, or between 0.5-3% by weight, or 0.5-2% by weight, or 0.5-1% by weight, or 1-3% by weight, or 1-2.5% by weight, or 1-2% by weight, or 1.5-2.5% by weight, or 2-3% by weight, or 2.5-3% by weight, or 0.5% by weight, or 1% by weight, or 1.5% by weight, or 2% by weight, or 2.5% by weight, or 3% by weight, or 3.5% by weight, or 4% by weight, or 4.5% by weight, or 5% by weight. In some embodiments, in the foregoing methods, the amount of the one or more additives added during the process is between 0.5-3% by weight or between 1.5-2.5% by weight.

In some embodiments, the precipitation material is in a powder form. In some embodiments, the precipitation material is in a dry powder form. In some embodiments, the precipitation material is disordered or is not in an ordered array or is in the powdered form. In still some embodiments, the precipitation material is in a partially or wholly hydrated form. In still some embodiments, the precipitation material is in saltwater or fresh water. In still some embodiments, the precipitation material is in water containing sodium chloride. In still some embodiments, the precipitation material is in water containing alkaline earth metal ions, such as, but are not limited to, calcium, magnesium, etc. In some embodiments, the precipitation material is non-medical or is not for medical procedures.

The products made from the compositions or the precipitation material provided herein show one or more properties, such as, high compressive strength, high durability, high porosity (light weight), high flexural strength, and less maintenance costs. In some embodiments, the compositions or the precipitation material upon combination with water, setting, and hardening, have a compressive strength of at least 3MPa (megapascal), or at least 7 MPa, or at least 10 MPa or in some embodiments, between 3-30 MPa, or between 14-80 MPa or 14-35 MPa.

In some embodiments of the foregoing aspects and embodiments, the composition or the precipitation material includes at least 10% w/w vaterite; or at least 20% w/w vaterite; or at least 30% w/w vaterite; or at least 40% w/w vaterite; or at least 50% w/w vaterite; or at least 60% w/w vaterite; or at least 70% w/w vaterite; or at least 80% w/w vaterite; or at least 90% w/w vaterite; or at least 95% w/w vaterite; or at least 99% w/w vaterite; or from 10% w/w to 99% w/w vaterite; or from 10% w/w to 90% w/w vaterite; or from 10% w/w to 80% w/w vaterite; or from 10% w/w to 70% w/w vaterite; or from 10% w/w to 60% w/w vaterite; or from 10% w/w to 50% w/w vaterite; or from 10% w/w to 40% w/w vaterite; or from 10% w/w to 30% w/w vaterite; or from 10% w/w to 20% w/w vaterite; or from 20% w/w to 99% w/w vaterite; or from 20% w/w to 95% w/w vaterite; or from 20% w/w to 90% w/w vaterite; or from 20% w/w to 75% w/w vaterite; or from 20% w/w to 50% w/w vaterite; or from 30% w/w to 99% w/w vaterite; or from 30% w/w to 95% w/w vaterite; or from 30% w/w to 90% w/w vaterite; or from 30% w/w to 75% w/w vaterite; or from 30% w/w to 50% w/w vaterite; or from 40% w/w to 99% w/w vaterite; or from 40% w/w to 95% w/w vaterite; or from 40% w/w to 90% w/w vaterite; or from 40% w/w to 75% w/w vaterite; or from 50% w/w to 99% w/w vaterite; or from 50% w/w to 95% w/w vaterite; or from 50% w/w to 90% w/w vaterite; or from 50% w/w to 75% w/w vaterite; or from 60% w/w to 99% w/w vaterite; or from 60% w/w to 95% w/w vaterite; or from 60% w/w to 90% w/w vaterite; or from 70% w/w to 99% w/w vaterite; or from 70% w/w to 95% w/w vaterite; or from 70% w/w to 90% w/w vaterite; or from 80% w/w to 99% w/w vaterite; or from 80% w/w to 95% w/w vaterite; or from 80% w/w to 90% w/w vaterite; or from 90% w/w to 99% w/w vaterite; or 10% w/w vaterite; or 20% w/w vaterite; or 30% w/w vaterite; or 40% w/w vaterite; or 50% w/w vaterite; or 60% w/w vaterite; or 70% w/w vaterite; or 75% w/w vaterite; or 80% w/w vaterite; or 85% w/w vaterite; or 90% w/w vaterite; or 95% w/w vaterite; or 99% w/w vaterite. The vatreite may be stable vaterite or reactive vaterite or PCC.

In some embodiments of the foregoing aspects and the foregoing embodiments, the precipitation material comprising vaterite after combination with water, setting, and hardening (i.e. transformation to aragonite) or the stable vaterite mixed with cement and water and after setting and hardening, has a compressive strength of at least 3 MPa; at least 7 MPa; at least 14 MPa; or at least 16 MPa; or at least 18 MPa; or at least 20 MPa; or at least 25 MPa; or at least 30 MPa; or at least 35 MPa; or at least 40 MPa; or at least 45 MPa; or at least 50 MPa; or at least 55 MPa; or at least 60 MPa; or at least 65 MPa; or at least 70 MPa; or at least 75 MPa; or at least 80 MPa; or at least 85 MPa; or at least 90 MPa; or at least 95 MPa; or at least 100 MPa; or from 3-50 MPa; or from 3-25 MPa; or from 3-15 MPa; or from 3-10 MPa; or from 14-25 MPa; or from 14-100 MPa; or from 14-80 MPa; or from 14-75 MPa; or from 14-50 MPa; or from 14-25 MPa; or from 17-35 MPa; or from 17-25 MPa; or from 20-100 MPa; or from 20-75 MPa; or from 20-50 MPa; or from 20-40 MPa; or from 30-90 MPa; or from 30-75 MPa; or from 30-60 MPa; or from 40-90 MPa; or from 40-75 MPa; or from 50-90 MPa; or from 50-75 MPa; or from 60-90 MPa; or from 60-75 MPa; or from 70-90 MPa; or from 70-80 MPa; or from 70-75 MPa; or from 80-100 MPa; or from 90-100 MPa; or from 90-95 MPa; or 14 MPa; or 3 MPa; or 7 MPa; or 16 MPa; or 18 MPa; or 20 MPa; or 25

MPa; or 30 MPa; or 35 MPa; or 40 MPa; or 45 MPa. For example, in some embodiments of the foregoing aspects and the foregoing embodiments, the composition after setting, and hardening has a compressive strength of 3 MPa to 25 MPa; or 14 MPa to 40 MPa; or 17 MPa to 40 MPa; or 20 MPa to 40 MPa; or 30 MPa to 40 MPa; or 35 MPa to 40 MPa. In some embodiments, the compressive strengths described herein are the compressive strengths after 1 day, or 3 days, or 7 days, or 28 days, or 56 days, or longer.

In some embodiments, the precipitation material comprising vaterite is a particulate composition with an average particle size of 0.1-100 microns. The average particle size (or average particle diameter) may be determined using any conventional particle size determination method, such as, but not limited to, multi-detector laser scattering or laser diffraction or sieving. In certain embodiments, unimodel or multimodal, e.g., bimodal or other, distributions are present. Bimodal distributions may allow the surface area to be minimized, thus allowing a lower liquids/solids mass ratio when composition is mixed with water yet providing smaller reactive particles for early reaction. In some embodiments, the composition or the precipitation material provided herein is a particulate composition with an average particle size of 0.1-1000 microns; or 0.1-500 microns; or 0.1-100 microns; or 0.1-50 microns; or 0.1-20 microns; or 0.1-10 microns; or 0.1-5 microns; or 1-50 microns; or 1-25 microns; or 1-20 microns; or 1-10 microns; or 1-5 microns; or 5-70 microns; or 5-50 microns; or 5-20 microns; or 5-10 microns; or 10-100 microns; or 10-50 microns; or 10-20 microns; or 10-15 microns; or 15-50 microns; or 15-30 microns; or 15-20 microns; or 20-50 microns; or 20-30 microns; or 30-50 microns; or 40-50 microns; or 50-100 microns; or 50-60 microns; or 60-100 microns; or 60-70 microns; or 70-100 microns; or 70-80 microns; or 80-100 microns; or 80-90 microns; or 0.1 microns; or 0.5 microns; or 1 microns; or 2 microns; or 3 microns; or 4 microns; or 5 microns; or 8 microns; or 10 microns; or 15 microns; or 20 microns; or 30 microns; or 40 microns; or 50 microns; or 60 microns; or 70 microns; or 80 microns; or 100 microns. For example, in some embodiments, the composition or the precipitation material provided herein is a particulate composition with an average particle size of 0.1-20 micron; or 0.1-15 micron; or 0.1-10 micron; or 0.1-8 micron; or 0.1-5 micron; or 1-25 micron; or 1-20 micron; or 1-15 micron; or 1-10 micron; or 1-5 micron; or 5-20 micron; or 5-10 micron. In some embodiments, the composition or the precipitation material includes two or more, or three or more, or four or more, or five or more, or ten or more, or 20 or more, or 3-20, or 4-10 different sizes of the particles in the composition or the precipitation material. For example, the composition or the precipitation material may include two or more, or three or more, or between 3-20 particles ranging from 0.1-10 micron, 10-50 micron, 50-100 micron, 100-200 micron, 200-500 micron, 500-1000 micron, and/or sub-micron sizes of the particles. In some embodiments, the PCC in the precipitation material may have average particle size below 0.1micron, such as between 0.001micron to 1 micron or more. In some embodiments, the PCC may be in nanometer particle size.

In some embodiments, the composition or the precipitation material may further include Ordinary Portland Cement (OPC) or Portland cement clinker. The amount of Portland cement component may vary and range from 10 to 95% w/w; or 10 to 90% w/w; or 10 to 80% w/w; or 10 to 70% w/w; or 10 to 60% w/w; or 10 to 50% w/w; or 10 to 40% w/w; or 10 to 30% w/w; or 10 to 20% w/w; or 20 to 90% w/w; or 20 to 80% w/w; or 20 to 70% w/w; or 20 to 60% w/w; or 20 to 50% w/w; or 20 to 40% w/w; or 20 to 30% w/w; or 30 to 90% w/w; or 30 to 80% w/w; or 30 to 70% w/w; or 30 to 60% w/w; or 30 to 50% w/w; or 30 to 40% w/w; or 40 to 90% w/w; or 40 to 80% w/w; or 40 to 70% w/w; or 40 to 60% w/w; or 40 to 50% w/w; or 50 to 90% w/w; or 50 to 80% w/w; or 50 to 70% w/w; or 50 to 60% w/w; or 60 to 90% w/w; or 60 to 80% w/w; or 60 to 70% w/w; or 70 to 90% w/w; or 70 to 80% w/w. For example, the composition or the precipitation material may include a blend of 75% OPC and 25% composition; or 80% OPC and 20% composition; or 85% OPC and 15% composition; or 90% OPC and 10% composition; or 95% OPC and 5% composition.

In certain embodiments, the composition or the precipitation material may further include an aggregate. Aggregate may be included in the composition or the precipitation material to provide for mortars which include fine aggregate and concretes which also include coarse aggregate. The fine aggregates are materials that almost entirely pass through a Number 4 sieve (ASTM C 125 and ASTM C 33), such as silica sand. The coarse aggregate are materials that are predominantly retained on a Number 4 sieve (ASTM C 125 and ASTM C 33), such as silica, quartz, crushed round marble, glass spheres, granite, limestone, calcite, feldspar, alluvial sands, sands or any other durable aggregate, and mixtures thereof. As such, the term "aggregate" is used broadly to refer to a number of different types of both coarse and fine particulate material, including, but are not limited to, sand, gravel, crushed stone, slag, and recycled concrete. The amount and nature of the aggregate may vary widely. In some embodiments, the amount of aggregate may range from 25 to 80%, such as 40 to 70% and including 50 to 70% w/w of the total composition made up of both the composition and the aggregate.

In some embodiments, the composition or the precipitation material, as prepared by the methods described above, sets and hardens after treatment with the aqueous medium under one or more suitable conditions. The aqueous medium includes, but is not limited to, fresh water optionally containing additives or brine. In some embodiments, the one or more suitable conditions include, but are not limited to, temperature, pressure, time period for setting, a ratio of the aqueous medium to the composition, and combination thereof. The temperature may be related to the temperature of the aqueous medium. In some embodiments, the temperature is in a range of 0-110° C.; or 0-80° C.; or 0-60° C.; or 0-40° C.; or 25-100° C.; or 25-75° C.; or 25-50° C.; or 37-100° C.; or 37-60° C.; or 40-100° C.; or 40-60° C.; or 50-100° C.; or 50-80° C.; or 60-100° C.; or 60-80° C.; or 80-100° C. In some embodiments, the pressure is atmospheric pressure or above atm. pressure. In some embodiments, the time period for setting the cement product is 30 min. to 48 hrs; or 30 min. to 24 hrs; or 30 min. to 12 hrs; or 30 min. to 8 hrs; or 30 min. to 4 hrs; or 30 min. to 2 hrs; 2 to 48 hrs; or 2 to 24 hrs; or 2 to 12 hrs; or 2 to 8 hrs; or 2 to 4 hrs; 5 to 48 hrs; or 5 to 24 hrs; or 5 to 12 hrs; or 5 to 8 hrs; or 5 to 4 hrs; or 5 to 2 hrs; 10 to 48 hrs; or 10 to 24 hrs; or 24 to 48 hrs.

During the mixing of the composition or the precipitation material with the aqueous medium, the precipitate may be subjected to high shear mixer. After mixing, the precipitate may be dewatered again and placed in pre-formed molds to make formed building materials or may be used to make formed building materials using the processes well known in the art or as described herein. Alternatively, the precipitate may be mixed with water and may be allowed to set. The precipitate may set over a period of days and may be then placed in the oven for drying, e.g., at 40° C., or from 40°

C-60° C., or from 40° C-50° C., or from 40° C-100° C., or from 50° C-60° C., or from 50° C-80° C., or from 50° C-100° C., or from 60° C-80° C., or from 60° C-100° C. The precipitate may be subjected to curing at high temperature, such as, from 50° C-60° C., or from 50° C-80° C., or from 50° C-100° C., or from 60° C-80° C., or from 60° C-100° C., or 60° C., or 80° C-100° C., in high humidity, such as, in 30%, or 40%, or 50%, or 60% humidity.

The product produced by the methods described herein may be an aggregate or building material or a pre-cast material or a formed building material. In some embodiments, the product produced by the methods described herein includes non-cementitious materials such as paper, paint, PVC etc. In some embodiments, the product produced by the methods described herein includes artificial reefs. These products have been described herein.

In some embodiments, the precipitation material in wet or dried form and may be mixed with one or more admixtures to impart one or more properties to the product including, but not limited to, strength, flexural strength, compressive strength, porosity, thermal conductivity, etc. The amount of admixture that is employed may vary depending on the nature of the admixture. In some embodiments, the amount of the one or more admixtures range from 1-50% w/w, such as 1-30% w/w, or 1-25% w/w, or 1-20% w/w/, or 2 to 10% w/w. Examples of the admixtures include, but not limited to, set accelerators, set retarders, air-entraining agents, foaming agents, defoamers, alkali-reactivity reducers, bonding admixtures, dispersants, coloring admixtures, corrosion inhibitors, damp-proofing admixtures, gas formers, permeability reducers, pumping aids, shrinkage compensation admixtures, fungicidal admixtures, germicidal admixtures, insecticidal admixtures, rheology modifying agents, finely divided mineral admixtures, pozzolans, aggregates, wetting agents, strength enhancing agents, water repellents, reinforced material such as fibers, and any other admixture. When using an admixture, the composition or the precipitation material, to which the admixture raw materials are introduced, is mixed for sufficient time to cause the admixture raw materials to be dispersed relatively uniformly throughout the composition.

Set accelerators may be used to accelerate the setting and early strength development of cement. Examples of set accelerators that may be used include, but are not limited to, POZZOLITH®NC534, non-chloride type set accelerator and/or RHEOCRETE®CNI calcium nitrite-based corrosion inhibitor, both sold under the above trademarks by BASF Admixtures Inc. of Cleveland, Ohio. Set retarding, also known as delayed-setting or hydration control, admixtures are used to retard, delay, or slow the rate of setting of cement. Most set retarders may also act as low level water reducers and can also be used to entrain some air into product. An example of a retarder is DELVO® by BASF Admixtures Inc. of Cleveland, Ohio. The air entrainer includes any substance that will entrain air in the compositions. Some air entrainers can also reduce the surface tension of a composition at low concentration. Air-entraining admixtures are used to purposely entrain microscopic air bubbles into cement. Air entrainment may increase the workability of the mix while eliminating or reducing segregation and bleeding. Materials used to achieve these desired effects can be selected from wood resin, natural resin, synthetic resin, sulfonated lignin, petroleum acids, proteinaceous material, fatty acids, resinous acids, alkylbenzene sulfonates, sulfonated hydrocarbons, vinsol resin, anionic surfactants, cationic surfactants, nonionic surfactants, natural rosin, synthetic rosin, an inorganic air entrainer, synthetic detergents, and their corresponding salts, and mixtures thereof. Air entrainers are added in an amount to yield a desired level of air in a cementitious composition. Examples of air entrainers that can be utilized in the admixture system include, but are not limited to MB AE 90, MB VR and MICRO AIR®, all available from BASF Admixtures Inc. of Cleveland, Ohio.

In some embodiments, the precipitation material is mixed with foaming agent. The foaming agents incorporate large quantities of air voids/porosity and facilitate reduction of the material's density. Examples of foaming agents include, but not limited to, soap, detergent (alkyl ether sulfate), Millifoam™ (alkyl ether sulfate), Cedepal™ (ammonium alkyl ethoxy sulfate), Witcolate™ 12760, and the like.

Also of interest as admixtures are defoamers. Defoamers are used to decrease the air content in the cementitious composition. Also of interest as admixtures are dispersants. The dispersant includes, but is not limited to, polycarboxylate dispersants, with or without polyether units. The term dispersant is also meant to include those chemicals that also function as a plasticizer, water reducer such as a high range water reducer, fluidizer, antiflocculating agent, or superplasticizer for compositions, such as lignosulfonates, salts of sulfonated naphthalene sulfonate condensates, salts of sulfonated melamine sulfonate condensates, beta naphthalene sulfonates, sulfonated melamine formaldehyde condensates, naphthalene sulfonate formaldehyde condensate resins for example LOMAR D® dispersant (Cognis Inc., Cincinnati, Ohio), polyaspartates, or oligomeric dispersants. Polycarboxylate dispersants can be used, by which is meant a dispersant having a carbon backbone with pendant side chains, wherein at least a portion of the side chains are attached to the backbone through a carboxyl group or an ether group.

Natural and synthetic admixtures may be used to color the product for aesthetic and safety reasons. These coloring admixtures may be composed of pigments and include carbon black, iron oxide, phthalocyanine, umber, chromium oxide, titanium oxide, cobalt blue, and organic coloring agents. Also of interest as admixtures are corrosion inhibitors. Corrosion inhibitors may serve to protect embedded reinforcing steel from corrosion. The materials commonly used to inhibit corrosion are calcium nitrite, sodium nitrite, sodium benzoate, certain phosphates or fluorosilicates, fluoroaluminites, amines and related chemicals. Also of interest are damp-proofing admixtures. Damp-proofing admixtures reduce the permeability of the product that has low cement contents, high water-cement ratios, or a deficiency of fines in the aggregate. These admixtures retard moisture penetration into dry products and include certain soaps, stearates, and petroleum products. Also of interest are gas former admixtures. Gas formers, or gas-forming agents, are sometimes added to the mix to cause a slight expansion prior to hardening. The amount of expansion is dependent upon the amount of gas-forming material used and the temperature of the fresh mixture. Aluminum powder, resin soap and vegetable or animal glue, saponin or hydrolyzed protein can be used as gas formers. Also of interest are permeability reducers. Permeability reducers may be used to reduce the rate at which water under pressure is transmitted through the mix. Silica fume, fly ash, ground slag, natural pozzolans, water reducers, and latex may be employed to decrease the permeability of the mix.

Also of interest are rheology modifying agent admixtures. Rheology modifying agents may be used to increase the viscosity of the compositions. Suitable examples of rheology modifier include firmed silica, colloidal silica, hydroxyethyl cellulose, starch, hydroxypropyl cellulose, fly ash (as defined in ASTM C618), mineral oils (such as light naphthenic), clay such as hectorite clay, polyoxyalkylenes, polysaccharides, natural gums, or mixtures thereof. Some of the mineral extenders such as, but not limited to, sepiolite clay are rheology modifying agents.

Also of interest are shrinkage compensation admixtures. TETRAGUARD® is an example of a shrinkage reducing agent and is available from BASF Admixtures Inc. of Cleveland, Ohio. Bacterial and fungal growth on or in hardened product may be partially controlled through the use of fungicidal and germicidal admixtures. The materials for these purposes include, but are not limited to, polyhalogenated phenols, dialdrin emulsions, and copper compounds. Also of interest in some embodiments is workability improving admixtures. Entrained air, which acts like a lubricant, can be used as a workability improving agent. Other workability agents are water reducers and certain finely divided admixtures.

In some embodiments, the composition or the precipitation material is employed with reinforced material such as fibers, e.g., where fiber-reinforced product is desirable. Fibers can be made of zirconia containing materials, aluminum, glass, steel, carbon, ceramic, grass, bamboo, wood, fiberglass, or synthetic materials, e.g., polypropylene, polycarbonate, polyvinyl chloride, polyvinyl alcohol, nylon, polyethylene, polyester, rayon, high-strength aramid, (i.e. Kevlar®), or mixtures thereof. The reinforced material is described in U.S. patent application Ser. No. 13/560,246, filed Jul. 27, 2012, which is incorporated herein in its entirety in the present disclosure.

The components of the precipitation material can be combined using any suitable protocol. Each material may be mixed at the time of work, or part of or all of the materials may be mixed in advance. Alternatively, some of the materials are mixed with water with or without admixtures, such as high-range water-reducing admixtures, and then the remaining materials may be mixed therewith. As a mixing apparatus, any conventional apparatus can be used. For example, Hobart mixer, slant cylinder mixer, Omni Mixer, Henschel mixer, V-type mixer, and Nauta mixer can be employed.

In one aspect, there is provided a system comprising a processor configured for processing the treatment or solvation of calcium compound with N-containing salt and optionally ammonia to make an aqueous solution comprising calcium salt and N-containing salt; a reactor configured to treat the aqueous solution comprising calcium salt and optionally solids with carbon dioxide from the cement plant to make a precipitation material comprising vaterite or PCC and a supernatant comprising aqueous solution of the residual N-containing salt; and a recovering system to recover the residual N-containing salt from the aqueous solution to recycle back to the processor. The recovering system is the system configured to carry out thermal decomposition, reverse osmosis, multi-stage flash, multi-effect distillation, vapor recompression, distillation, and combinations thereof.

The methods and systems provided herein may be carried out at land (e.g., at a location where the cement plant calcining the limestone is present, or is easily and economically transported in), at sea, or in the ocean. In some embodiments, the cement plants calcining the limestone may be retro-fitted with the systems described herein to form the precipitation material and further to form products from the precipitation material.

Aspects include systems, including processing plants or factories, for practicing the methods as described herein. Systems may have any configuration that enables practice of the particular production method of interest.

In certain embodiments, the systems include a source of calcium compound or the calcium compound -containing aqueous solution from the cement plant and a structure having an input for the aqueous solution. For example, the systems may include a pipeline or analogous feed of calcium compound aqueous solution, wherein the aqueous solution is brine, seawater, or freshwater. The system further includes an input for $CO_2$ from the cement plant as well as components for combining these sources with water (optionally an aqueous solution such as water, brine or seawater) before the precipitation reactor or in the precipitation reactor. In some embodiments, the gas-liquid contactor is configured to contact enough $CO_2$ to produce precipitation material in excess of 1, 10, 100, 1,000, or 10,000 tons per day.

The systems further include a precipitation reactor that subjects the water introduced to the precipitation reactor to one or more of the precipitation conditions (as described herein) and produces the precipitation material and the supernatant. In some embodiments, the precipitation reactor is configured to hold water sufficient to produce precipitation material in excess of 1, 10, 100, 1,000, or 10,000 tons per day. The precipitation reactor may also be configured to include any of a number of different elements such as temperature modulation elements (e.g., configured to heat the water to a desired temperature), chemical additive elements (e.g., configured for introducing additives etc. into the precipitation reaction mixture), computer automation, and the like.

A gaseous waste stream of $CO_2$ may be provided from the cement plant to the site of precipitation in any convenient manner. In some embodiments, the gaseous waste stream is provided with a gas conveyer (e.g., a duct) that runs from a site of the cement plant to one or more locations of the precipitation site. The source of the gaseous waste stream may be a distal location relative to the site of precipitation such that the source of the gaseous waste stream is a location that is 1 mile or more, such as 10 miles or more, including 100 miles or more, from the precipitation location. For example, the gaseous waste stream may have been transported to the site of precipitation from a remote cement plant via a $CO_2$ gas conveyance system (e.g., a pipeline). The cement plant generated $CO_2$ containing gas may or may not be processed (e.g., remove other components) before it reaches the precipitation site (i.e., the site in which precipitation and/or production of products takes place). In yet other instances, the gaseous waste stream source is proximal to the precipitation site. For example, the precipitation site is integrated with the gaseous waste stream source, such as the cement plant that integrates a precipitation reactor for precipitation of precipitation material that may be used to produce the products.

Where the saltwater source that is processed by the system to produce the carbonate compound composition is seawater, the input is in fluid communication with a source of sea water, e.g., such as where the input is a pipeline or feed from ocean water to a land based system or an inlet port in the hull of ship, e.g., where the system is part of a ship, e.g., in an ocean based system.

The methods and systems may also include one or more detectors configured for monitoring the source of aqueous medium or the source of carbon dioxide (not illustrated in figures). Monitoring may include, but is not limited to, collecting data about the pressure, temperature and composition of the water or the carbon dioxide gas. The detectors may be any convenient device configured to monitor, for example, pressure sensors (e.g., electromagnetic pressure sensors, potentiometric pressure sensors, etc.), temperature sensors (resistance temperature detectors, thermocouples, gas thermometers, thermistors, pyrometers, infrared radiation sensors, etc.), volume sensors (e.g., geophysical diffraction tomography, X-ray tomography, hydroacoustic surveyers, etc.), and devices for determining chemical makeup of the water or the carbon dioxide gas (e.g, IR spectrometer, NMR spectrometer, UV-vis spectrophotometer, high performance liquid chromatographs, inductively coupled plasma emission spectrometers, inductively coupled plasma mass spectrometers, ion chromatographs, X-ray diffractometers, gas chromatographs, gas chromatography-mass spectrometers, flow-injection analysis, scintillation counters, acidimetric titration, and flame emission spectrometers, etc.).

In some embodiments, detectors may also include a computer interface which is configured to provide a user with the collected data about the aqueous medium, calcium compound, and/or the carbon dioxide gas. In some embodiments, the summary may be stored as a computer readable data file or may be printed out as a user readable document.

In some embodiments, the detector may be a monitoring device such that it can collect real-time data (e.g., internal pressure, temperature, etc.). In other embodiments, the detector may be one or more detectors configured to determine the parameters of the aqueous medium, and/or the carbon dioxide gas at regular intervals, e.g., determining the composition every 1 minute, every 5 minutes, every 10 minutes, every 30 minutes, every 60 minutes, every 100 minutes, every 200 minutes, every 500 minutes, or some other interval.

In certain embodiments, the system may further include a station for preparing a building material, such as cement or aggregate, from the precipitate. Other materials such as formed building materials and/or non-cementitious materials may also be formed from the precipitate and appropriate station may be used for preparing the same.

As indicated above, the system may be present on land or sea. For example, the system may be land-based system that is in a coastal region, e.g., close to a source of seawater, or even an interior location, where water is piped into the system from a salt-water source, e.g., ocean. Alternatively, the system is a water based system, i.e., a system that is present on or in water. Such a system may be present on a boat, ocean based platform etc., as desired.

Calcium carbonate slurry is pumped via pump to drying system, which in some embodiments includes a filtration step followed by spray drying. The water separated from the drying system is discharged or is recirculated to the reactor. The resultant solid or powder from drying system is utilized as cement or aggregate to produce building materials, effectively sequestering the $CO_2$. The solid or powder may also be used as a PCC filler in non-cementitious products such as paper, plastic, paint etc. The solid or powder may also be used in forming formed building materials, such as drywall, cement boards, etc.

In some embodiments, the systems may include a control station, configured to control the amount of the carbon dioxide, the amount of the N-containing salt, and/or the amount of calcium compound conveyed to the precipitator or the charger; the amount of the precipitate conveyed to the separator; the amount of the precipitate conveyed to the drying station; and/or the amount of the precipitate conveyed to the refining station. A control station may include a set of valves or multi-valve systems which are manually, mechanically or digitally controlled, or may employ any other convenient flow regulator protocol. In some instances, the control station may include a computer interface, (where regulation is computer-assisted or is entirely controlled by computer) configured to provide a user with input and output parameters to control the amount, as described above.

II. Products

Provided herein are methods and systems for utilizing the gaseous waste stream of $CO_2$ and the calcium compound from the cement plant to produce the precipitation material comprising calcium carbonate in vaterite and/or aragonite polymorphic forms which vaterite transforms to aragonite and forms cement. Provided herein are environmentally friendly methods of removing or separating $CO_2$ from a gaseous waste stream from the cement plant, and fixing the $CO_2$ into a non-gaseous, storage-stable form (e.g., materials for the construction of structures such as buildings and infrastructure, as well as the structures themselves or formed building materials such as drywall, or non-cementitious materials such as paper, paint, plastic, etc. or artificial reefs) such that the $CO_2$ does not escape into the atmosphere.

Building Material

The "building material" used herein includes material used in construction. In one aspect, there is provided a structure or a building material comprising the set and hardened form of the precipitation material e.g. where the reactive vaterite has converted to aragonite or PCC that sets and hardens. The product containing the aragonite form of the precipitate shows one or more unexpected properties, including but not limited to, high compressive strength, high porosity (low density or light weight), neutral pH (e.g. useful as artificial reef), microstructure network, etc.

Examples of such structures or the building materials include, but are not limited to, building, driveway, foundation, kitchen slab, furniture, pavement, road, bridges, motorway, overpass, parking structure, brick, block, wall, footing for a gate, fence, or pole, and combination thereof.

Formed Building Material

The "formed building material" used herein includes materials shaped (e.g., molded, cast, cut, or otherwise produced) into structures with defined physical shape. The formed building material may be a pre-cast building material, such as, a pre-cast cement or concrete product. The formed building materials and the methods of making and using the formed building materials are described in U.S. application Ser. No. 12/571,398, filed Sep. 30, 2009, which is incorporated herein by reference in its entirety. The formed building materials may vary greatly and include materials shaped (e.g., molded, cast, cut, or otherwise produced) into structures with defined physical shape, i.e., configuration. Formed building materials are distinct from amorphous building materials (e.g., powder, paste, slurry, etc.) that do not have a defined and stable shape, but instead conform to the container in which they are held, e.g., a bag or other container. Formed building materials are also distinct from irregularly or imprecisely formed materials (e.g., aggregate, bulk forms for disposal, etc.) in that formed building materials are produced according to specifications that allow for use of formed building materials in, for example, buildings. Formed building materials may be prepared in accordance with traditional manufacturing protocols for such structures, with the exception that the composition of the invention is employed in making such materials.

In some embodiments, the methods provided herein further include setting and hardening the precipitation material comprising reactive vaterite where the reactive vaterite has converted to aragonite, or the PCC that has set and hardened and forming a formed building material.

In some embodiments, the formed building materials made from the precipitation material have a compressive strength or the flexural strength of at least 3 MPa, at least 10 MPa, or at least 14 MPa, or between 3-30 MPa, or between about 14-100 MPa, or between about 14-45 MPa; or the compressive strength of the precipitation material after setting, and hardening, as described herein.

Examples of the formed building materials that can be produced by the foregoing methods, include, but not limited to, masonry units, for example only, bricks, blocks, and tiles including, but not limited to, ceiling tiles; construction panels, for example only, cement board (boards traditionally made from cement such as fiber cement board) and/or drywall (boards traditionally made from gypsum); conduits; basins; beam; column, slab; acoustic barrier; insulation material; or combinations thereof. Construction panels are formed building materials employed in a broad sense to refer to any non-load-bearing structural element that are characterized such that their length and width are substantially greater than their thickness. As such the panel may be a plank, a board, shingles, and/or tiles. Exemplary construction panels formed from the precipitation material include cement boards and/or drywall. Construction panels are polygonal structures with dimensions that vary greatly depending on their intended use. The dimensions of construction panels may range from 50 to 500 cm in length, including 100 to 300 cm, such as 250 cm; width ranging from 25 to 200 cm, including 75 to 150 cm, such as 100 cm; thickness ranging from 5 to 25 mm, including 7 to 20 mm, including 10 to 15 mm.

In some embodiments, the cement board and/or the drywall may be used in making different types of boards such as, but not limited to, paper-faced board (e.g. surface reinforcement with cellulose fiber), fiberglass-faced or glass mat-faced board (e.g. surface reinforcement with glass fiber mat), fiberglass mesh reinforced board (e.g. surface reinforcement with glass mesh), and/or fiber-reinforced board (e.g. cement reinforcement with cellulose, glass, fiber etc.). These boards may be used in various applications including, but not limited to, sidings such as, fiber-cement sidings, roofing, soffit, sheathing, cladding, decking, ceiling, shaft liner, wall board, backer, trim, frieze, shingle, and fascia, and/or underlayment.

The cement boards traditionally are made from cement such as Ordinary Portland cement (OPC), magnesium oxide cement and/or calcium silicate cement. The cement boards made by the methods provided herein are made from the precipitation material that partially or wholly replaces the traditional cement in the board. In some embodiments, the cement boards may comprise construction panels prepared as a combination of aragonitic cement (setting and hardening when vaterite transforms to aragonite) and fiber and/or fiberglass and may possess additional fiber and/or fiberglass reinforcement at both faces of the board.

The cement boards are formed building materials which in some embodiments, are used as backer boards for ceramics that may be employed behind bathroom tiles, kitchen counters, backsplashes, etc. and may have lengths ranging from 100 to 200 cm,. Cement boards may vary in physical and mechanical properties. In some embodiments, the flexural strength may vary, ranging between 1 to 7.5 MPa, including 2 to 6 MPa, such as 5 MPa. The compressive strengths may also vary, ranging from 5 to 50 MPa, including 10 to 30 MPa, such as 15 to 20 MPa. In some embodiments, cement boards may be employed in environments having extensive exposure to moisture (e.g., commercial saunas). The composition or the precipitation material described herein may be used to produce the desired shape and size to form a cement board. In addition, a variety of further components may be added to the cement boards which include, but are not limited to, plasticizers, clay, foaming agents, accelerators, retarders and air entrainment additives. The composition is then poured out into sheet molds or a roller may be used to form sheets of a desired thickness. The shaped composition may be further compacted by roller compaction, hydraulic pressure, vibrational compaction, or resonant shock compaction. The sheets are then cut to the desired dimensions of the cement boards.

Another type of construction panel formed from the composition or the precipitation material described herein is backer board. The backer board may be used for the construction of interior, and/or exterior floors, walls and ceilings. In the embodiments, the backer board is made partially or wholly from the precipitation material.

Another type of construction panel formed from the compositions or the precipitation material is drywall. The "drywall" as used herein, includes board that is used for construction of interior, and/or exterior floors, walls and ceilings. Traditionally, drywall is made from gypsum (called paper-faced board). In the embodiments, the drywall is made partially or wholly from the carbonate precipitation material thereby replacing gypsum from the drywall product. In some embodiments, the drywall may comprise construction panels prepared as a combination of aragonitic cement (setting and hardening when vaterite transforms to aragonite) and cellulose, fiber and/or fiberglass and may possess additional paper, fiber, fiberglass mesh and/or fiberglass mat reinforcement at both faces of the board. Various processes for making the drywall product are well known in the art and are well within the scope of the invention. Some examples include, but not limited to, wet process, semi dry process, extrusion process, wonderborad® process, etc., that have been described herein.

In some embodiments, the drywall is panel made of a paper liner wrapped around an inner core. For example, in some embodiments, during the process of making the drywall product from the precipitation material, the slurry of the precipitation material comprising vaterite is poured over a sheet of paper. Another sheet of paper is then put on top of the precipitation material such that the precipitation material is flanked by the paper on both sides (the resultant composition sandwiched between two sheets of outer material, e.g., heavy paper or fiberglass mats). The vaterite in the precipitation material is then transformed to aragonite (using additives and/or heat) which then sets and hardens. When the core sets and is dried in a large drying chamber, the sandwich becomes rigid and strong enough for use as a building material. The drywall sheets are then cut and separated.

The flexural and compressive strengths of the drywall formed from the precipitation material are equal to or higher than conventional drywall prepared with gypsum plaster, which is known to be a soft construction material. In some embodiments, the flexural strength may range between 0.1 to 3 MPa, including 0.5 to 2 MPa, such as 1.5 MPa. The compressive strengths may also vary, in some instances ranging from 1 to 20 MPa, including 5 to 15 MPa, such as 8 to 10 MPa. In some embodiments, the formed building materials such as, the construction panels such as, but not limited to, cement boards and drywall produced by the methods described herein, have low density and high porosity making them suitable for lightweight and insulation applications. The high porosity and light weight of the formed building materials such as construction panels may be due to the development of the aragonitic microstructure when vaterite transforms to aragonite. The transformation of vaterite during dissolution/re-precipitation process may lead to micro porosity generation while at the same time the voids created between the aragonitic crystals formed may provide nano porosity thereby leading to highly porous and light weight structure. Certain admixtures may be added during the transformation process such as, but not limited to, foaming agents, rheology modifiers and mineral extenders, such as, but not limited to, clay, starch, etc. which may add to the porosity in the product as the foaming agent may entrain air in the mixture and lower the overall density and mineral extender such as sepiolite clay may increase the viscosity of the mixture thereby preventing segregation of the precipitation material and water.

One of the applications of the cement board or drywall is fiber cement siding. Fiber-cement sidings formed by the methods provided herein comprise construction panels prepared as a combination of aragonitic cement, aggregate, interwoven cellulose, and/or polymeric fibers and may possess a texture and flexibility that resembles wood.

In some embodiments, the formed building materials are masonry units. Masonry units are formed building materials used in the construction of load-bearing and non-load-bearing structures that are generally assembled using mortar, grout, and the like. Exemplary masonry units formed from the compositions include bricks, blocks, and tiles.

Another formed building material formed from the precipitation material described herein is a conduit. Conduits are tubes or analogous structures configured to convey a gas or liquid, from one location to another. Conduits can include any of a number of different structures used in the conveyance of a liquid or gas that include, but are not limited to, pipes, culverts, box culverts, drainage channels and portals, inlet structures, intake towers, gate wells, outlet structures, and the like.

Another formed building material formed from the precipitation material described herein is basins. The term basin may include any configured container used to hold a liquid, such as water. As such, a basin may include, but is not limited to structures such as wells, collection boxes, sanitary manholes, septic tanks, catch basins, grease traps/separators, storm drain collection reservoirs, etc.

Another formed building material formed from the precipitation material described herein is a beam, which, in a broad sense, refers to a horizontal load-bearing structure possessing large flexural and compressive strengths. Beams may be rectangular cross-shaped, C-channel, L-section edge beams, I-beams, spandrel beams, H-beams, possess an inverted T-design, etc. Beams of the invention may also be horizontal load-bearing units, which include, but are not limited to joists, lintels, archways and cantilevers.

Another formed building material formed from the precipitation material described herein is a column, which, in a broad sense, refers to a vertical load-bearing structure that carries loads chiefly through axial compression and includes structural elements such as compression members. Other vertical compression members of the invention may include, but are not limited to pillars, piers, pedestals, or posts.

Another formed building material formed from the precipitation material described herein is a concrete slab. Concrete slabs are those building materials used in the construction of prefabricated foundations, floors and wall panels. In some instances, a concrete slab may be employed as a floor unit (e.g., hollow plank unit or double tee design).

Another formed building material formed from the precipitation material described herein is an acoustic barrier, which refers to a structure used as a barrier for the attenuation or absorption of sound. As such, an acoustic barrier may include, but is not limited to, structures such as acoustical panels, reflective barriers, absorptive barriers, reactive barriers, etc.

Another formed building material formed from the precipitation material described herein is an insulation material, which refers to a material used to attenuate or inhibit the conduction of heat. Insulation may also include those materials that reduce or inhibit radiant transmission of heat.

In some embodiments, the other formed building materials such as pre-cast concrete products include, but not limited to, bunker silo; cattle feed bunk; cattle grid; agricultural fencing; H-bunks; J-bunks; livestock slats; livestock watering troughs; architectural panel walls; cladding (brick); building trim; foundation; floors, including slab on grade; walls; double wall precast sandwich panel; aqueducts; mechanically stabilized earth panels; box culverts; 3-sided culverts; bridge systems; RR crossings; RR ties; sound walls/barriers; Jersey barriers; tunnel segments; reinforced concrete box; utillity protection structure; hand holes; hollowcore product; light pole base; meter box; panel vault; pull box; telecom structure; transformer pad; transformer vault; trench; utility vault; utility pole; controlled environment vaults; underground vault; mausoleum; grave stone; coffin; haz mat storage container; detention vaults; catch basins; manholes; aeration system; distribution box; dosing tank; dry well; grease interceptor; leaching pit; sand-oil/oil-water interceptor; septic tank; water/sewage storage tank; wetwells; fire cisterns; floating dock; underwater infrastructure; decking; railing; sea walls; roofing tiles; pavers; community retaining wall; res. retaining wall; modular block systems; and segmental retaining walls.

Non-Cementitious Compositions

In some embodiments, the methods described herein include making other products from the precipitation material described herein including, but not limited to, non-cementitious compositions including paper, polymer product, lubricant, adhesive, rubber product, chalk, asphalt product, paint, abrasive for paint removal, personal care product, cosmetic, cleaning product, personal hygiene product, ingestible product, agricultural product, soil amendment product, pesticide, environmental remediation product, and combination thereof. Such compositions have been described in U.S. Pat. No. 7,829,053, issued Nov. 9, 2010, which is incorporated herein by reference in its entirety.

Artificial Marine Structures

In some embodiments, the methods described herein include making artificial marine structures from the precipitation material described herein including, but not limited to, artificial corals and reefs. In some embodiments, the artificial structures can be used in the aquariums or sea. In some embodiments, these products are made from the precipitated material comprising reactive vaterite that transforms to aragonite after setting and hardening. The aragonitic cement provides neutral or close to neutral pH which may be conducive for maintenance and growth of marine life. The aragonitic reefs may provide suitable habitat for marine species.

The following examples are put forth so as to provide those of ordinary skill in the art with a complete disclosure and description of how to make and use the invention, and are not intended to limit the scope of what the inventors regard as their invention nor are they intended to represent that the experiments below are all or the only experiments performed. Efforts have been made to ensure accuracy with respect to numbers used (e.g. amounts, temperature, etc.) but some experimental errors and deviations should be accounted for. Unless indicated otherwise, parts are parts by weight, molecular weight is weight average molecular weight, temperature is in degrees Centigrade, and pressure is at or near atmospheric.

EXAMPLES

Example 1

Formation and Transformation of the Precipitation Material from Calcined Limestone $NH_4Cl$ was dissolved into water. Limestone was calcined at 950° C. for 4 hours, cooled to room temperature and added to the aqueous solution of $NH_4Cl$ and mixed for a few hours. The resultant mixture was decanted to remove heavy impurities. The unfiltered solution was transferred to an airtight vessel. The solution was fed through a heat-exchanger which preheated the solution to 40° C. The carbonation reactor was an acrylic cylinder, equipped with baffles, gas diffuser, pH electrode, thermocouple, turbine impeller, and inlet and outlet ports for liquid, gases, and slurry. Mass flow controllers proportioned a $CO_2$ inlet gas. During startup, the solution in the vessel was pumped into the reactor through the heat exchanger. The mixer was stirred while the $CO_2$ gas was introduced through the gas diffuser. The continuous inlet flow of fresh reactant solution was controlled by maintaining the reactor pH at 8. The resultant reactive vaterite slurry was continuously collected into a holding container. The slurry was vacuum filtered. The reactive vaterite filter cake was oven dried at 100° C. The cake showed 100% vaterite with a mean particle size of 9 um. The clear filtrate containing regenerated $NH_4Cl$ was recycled in subsequent experiments.

Example 2

Formation and Transformation of the Precipitation Material from Lime and $CO_2$ $NH_4Cl$ is dissolved into water. Calcium oxide is added to the aq. solution and mixed for few hours. The resultant mixture is vacuum filtered to remove the insoluble impurities. The clear filtrate is transferred to an airtight, collapsible bag. The bag is submersed in a water bath, which preheats the solution to 35° C. The carbonation reactor is an acrylic cylinder, equipped with baffles, gas diffuser, pH electrode, thermocouple, turbine impeller, and inlet and outlet ports for liquid, gases and slurry. Mass flow controllers proportion a $CO_2$ inlet gas. During startup, the solution in the bag is pumped into the reactor. The mixer is stirred while the $CO_2$ gas is introduced through the gas diffuser. A computer automated control loop controls the continuous inlet flow of fresh reactant solution maintaining the pH at 7.5. The resultant reactive vaterite slurry is continuously collected into a holding container. The slurry is vacuum filtered. The reactive vaterite filter cake is oven dried at 100° C. The cake shows 100% vaterite with a PSA Mean. The clear filtrate containing regenerated $NH_4Cl$ is recycled in subsequent experiments.

The dried reactive vaterite solid is mixed into a paste. The XRD of the paste after 1 day shows 99.9% aragonite (vaterite fully converted to aragonite). The pastes are cast into 2"×2"×2" cubes, which set and harden in a humidity chamber set to 60° C. and 80% of relative humidity for 7 days. The cemented cubes are dried in a 100° C. oven. Destructive testing determines the compressive strength of the cubes to be 4600 psi (~31 MPa).

Although the foregoing invention has been described in some detail by way of illustration and example for purposes of clarity of understanding, it should be readily apparent to those of ordinary skill in the art in light of the teachings of this invention that certain changes and modifications may be made thereto without departing from the spirit or scope of the appended claims. Accordingly, the preceding merely illustrates the principles of the invention. It will be appreciated that those skilled in the art will be able to devise various arrangements, which, although not explicitly described or shown herein, embody the principles of the invention, and are included within its spirit and scope. Furthermore, all examples and conditional language recited herein are principally intended to aid the reader in understanding the principles of the invention and the concepts contributed by the inventors to furthering the art, and are to be construed as being without limitation to such specifically recited examples and conditions. Moreover, all statements herein reciting principles, aspects, and embodiments of the invention as well as specific examples thereof, are intended to encompass both structural and functional equivalents thereof. Additionally, it is intended that such equivalents include both currently known equivalents and equivalents developed in the future, i.e., any elements developed that perform the same function, regardless of structure. The scope of the invention, therefore, is not intended to be limited to the exemplary embodiments shown and described herein. It is intended that the following claims define the scope of the invention and that methods and structures within the scope of these claims and their equivalents be covered thereby.

What is claimed is:

1. A method comprising:
    a) calcining limestone to form carbon dioxide and calcium compound comprising calcium oxide, wherein the limestone comprises magnesium carbonate, and wherein the calcium oxide comprises soft burnt lime;
    b) treating the calcium compound with N-containing salt in water to produce an aqueous solution comprising calcium salt and solid; and
    c) contacting the aqueous solution comprising calcium salt and solid with the carbon dioxide to produce a precipitation material comprising calcium carbonate and solid wherein the calcium carbonate comprises vaterite.

2. The method of claim 1, wherein the treating step further comprises adding anhydrous ammonia or an aqueous solution of ammonia.

3. The method of claim 1, wherein the N-containing salt is N-containing inorganic salt, N-containing organic salt, or combination thereof.

4. The method of claim 1, wherein the N-containing salt is N-containing inorganic salt selected from the group consisting of ammonium halide, ammonium acetate, ammonium sulfate, ammonium sulfite, ammonium nitrate, ammonium nitrite, and combinations thereof.

5. The method of claim 1, wherein the N-containing salt is ammonium chloride.

6. The method of claim 1, wherein the N-containing salt is N-containing organic salt that has N-containing organic compound selected from the group consisting of aliphatic amine, alicyclic amine, heterocyclic amine, and combinations thereof.

7. The method of claim 1, wherein molar ratio of the N-containing salt:calcium compound is between about 0.5:1 to 4:1 by weight.

8. The method of claim 1, further comprising removing and optionally recovering ammonia and/or N-containing salt using one or more steps of (i) recovering a gas exhaust stream comprising ammonia during the treating and/or the contacting step; (ii) wherein the supernatant aqueous solution comprises residual N-containing salt and further comprising recovering the residual N-containing salt from the supernatant aqueous solution; and (iii) wherein the precipitation material comprises residual N-containing salt and further comprising removing and optionally recovering the residual N-containing salt from the precipitation material.

9. The method of claim 8, further comprising recovering the residual N-containing salt from the supernatant aqueous solution using recovery process selected from the group consisting of thermal decomposition, pH adjustment, reverse osmosis, multi-stage flash, multi-effect distillation, vapor recompression, distillation, and combinations thereof and/or further comprising recovering the residual N-containing salt from the precipitation material comprises heating the precipitation material between about 150-360° C. to evaporate the N-containing salt from the precipitation material with optional recovery by condensation of the N-containing salt.

10. The method of claim 8, wherein the step of recovering the gas exhaust stream comprising ammonia comprises subjecting the gas exhaust stream comprising ammonia to a scrubbing process wherein the scrubbing process comprises scrubbing the gas exhaust stream comprising ammonia with the carbon dioxide from the industrial process and water.

11. The method of claim 8, wherein the step of recovering the gas exhaust stream comprising ammonia comprises subjecting the gas exhaust stream comprising ammonia to a scrubbing process wherein the scrubbing process comprises scrubbing the gas exhaust stream comprising ammonia with hydrochloric acid and water to produce a solution of ammonium chloride.

12. The method of claim 1, wherein the vaterite is reactive vaterite or stable vaterite.

13. The method of claim 12, further comprising adding water to the precipitation material comprising reactive vaterite and transforming the vaterite to aragonite wherein the aragonite sets and hardens to form cement or cementitious product.

14. The method of claim 13, wherein the cementitious product is aggregate; building material; or formed building material selected from masonry unit, construction panel, conduit, basin, beam, column, slab, acoustic barrier, insulation material, and combinations thereof.

15. The method of claim 1, wherein the solids comprise carbon, silica, iron oxide, aluminum oxide, or combination thereof.

16. The method of claim 1, wherein the contracting step is under one or more precipitation conditions comprising pH of between 7-8.5 of the aqueous solution, temperature of the solution between 20-80° C., residence time of between 15-60 minutes, or combinations thereof.

17. A product formed by the method according to claim 1.

18. The method of claim 1, wherein the calcium oxide further comprises underburnt lime, dead burnt lime, or combination thereof.

19. The method of claim 1, further comprising adding an additive to the aqueous solution or to the precipitation material, wherein the additive is selected from the group consisting of fatty acid ester, sodium decyl sulfate, lauric acid, sodium salt of lauric acid, urea, citric acid, sodium salt of citric acid, phthalic acid, sodium salt of aspartic acid, magnesium chloride, acetic acid, sodium salt of acetic acid, glutamic acid, sodium salt of glutamic acid, strontium chloride, gypsum, lithium chloride, sodium chloride, glycine, sodium citrate dehydrate, sodium bicarbonate, magnesium sulfate, magnesium acetate, sodium polystyrene, sodium dodecylsulfonate, poly-vinyl alcohol, and combination thereof.

20. The method of claim 1, wherein the vaterite is unimodal, bimodal, or multimodal distribution of a particulate composition with an average particle size of between 0.1-100 micron.

21. The method of claim 1, further comprising blending the precipitation material with Ordinary Portland Cement (OPC), aggregate, or combination thereof.

22. The method of claim 1, further comprising mixing the precipitation material with one or more admixture selected from the group consisting of set accelerator, set retarder, air-entraining agent, foaming agent, defoamer, alkali-reactivity reducer, bonding admixture, dispersant, coloring admixture, corrosion inhibitor, damp-proofing admixture, gas former, permeability reducer, pumping aid, shrinkage compensation admixture, fungicidal admixture, germicidal admixture, insecticidal admixture, rheology modifying agent, water repellent, reinforced material, and combination thereof.

23. The method of claim 22, wherein the reinforced material is a fiber made of zirconia, aluminum, glass, steel, carbon, ceramic, grass, bamboo, wood, fiberglass, synthetic material, or combination thereof.

* * * * *